United States Patent
Batts

(10) Patent No.: US 11,932,401 B2
(45) Date of Patent: *Mar. 19, 2024

(54) TACTICAL TURBINE AEROSOL GENERATOR INTEGRATED WITH AN UNMANNED AERIAL VEHICLE

(71) Applicant: Felix M Batts, Raleigh, NC (US)

(72) Inventor: Felix M Batts, Raleigh, NC (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/698,782

(22) Filed: Mar. 18, 2022

(65) Prior Publication Data
US 2022/0234736 A1    Jul. 28, 2022

Related U.S. Application Data

(63) Continuation-in-part of application No. 16/891,674, filed on Jun. 3, 2020, now Pat. No. 11,305,307.
(Continued)

(51) Int. Cl.
*B64D 1/18*   (2006.01)
*B64C 39/02*  (2023.01)
(Continued)

(52) U.S. Cl.
CPC .............. *B64D 1/18* (2013.01); *B64C 39/024* (2013.01); *B64F 1/007* (2013.01); *B64U 10/13* (2023.01);
(Continued)

(58) Field of Classification Search
CPC ......... B64D 1/18; B64C 39/024; B64F 1/007; B64U 10/13; B64U 30/20; B64U 50/12; B64U 2101/00; B64U 2201/104; B64U 2201/20; B64U 50/19; B64U 70/00; B64U 2101/60
See application file for complete search history.

(56) References Cited

U.S. PATENT DOCUMENTS 2,836,567 A   5/1958   Reure et al.
4,484,195 A   11/1984  Shaffer
(Continued)

FOREIGN PATENT DOCUMENTS

WO        9209544 A1   6/1992

*Primary Examiner* — Vishal Pancholi
(74) *Attorney, Agent, or Firm* — The Law Firm of Andrea Hence Evans, LLC

(57) ABSTRACT

Disclosed herein is an apparatus. An embodiment of the apparatus can include a turbine aerosol generator which comprises an aerosol generator. The aerosol generator can comprise a solution tank assembly to transport an aerosol solution for vaporization. The aerosol generator includes a motor device configured to vaporize the aerosol solution and expel the aerosol solution. Aerosol generator can also comprise an engine control unit in electrical communication with the motor device. The aerosol generator includes a transmitter assembly to communicate with other components. The apparatus can also include an unmanned aerial vehicle (UAV). The UAV can comprise a vehicle body that couples to the aerosol generator. The UAV comprises a power unit that provides flight and a vehicle computer. The apparatus further comprises a remote control device to communicate with other components. The apparatus also comprises a landing platform for fueling and/or recharge of the UAV and aerosol generator.

19 Claims, 26 Drawing Sheets

Related U.S. Application Data

(60) Provisional application No. 62/856,678, filed on Jun. 3, 2019.

(51) Int. Cl.
*B64F 1/00* (2006.01)
*B64U 10/13* (2023.01)
*B64U 30/20* (2023.01)
*B64U 50/12* (2023.01)
*B64U 101/00* (2023.01)

(52) U.S. Cl.
CPC .............. *B64U 30/20* (2023.01); *B64U 50/12* (2023.01); *B64U 2101/00* (2023.01); *B64U 2201/104* (2023.01)

(56) References Cited

U.S. PATENT DOCUMENTS

| | | |
|---|---|---|
| 4,998,479 A | 3/1991 | Perham et al. |
| 5,115,633 A | 5/1992 | Priser et al. |
| H1124 H | 1/1993 | Rouse et al. |
| 5,937,141 A | 8/1999 | Swiatosz |
| 2015/0226530 A1 | 8/2015 | Batts |
| 2018/0155026 A1* | 6/2018 | Policicchio ............ B64C 39/024 |
| 2019/0047694 A1* | 2/2019 | Zivan .................... B64C 31/036 |
| 2020/0145789 A1* | 5/2020 | Tullman .................. H04W 4/40 |
| 2020/0361601 A1* | 11/2020 | Mikic .................... B64C 27/52 |

\* cited by examiner

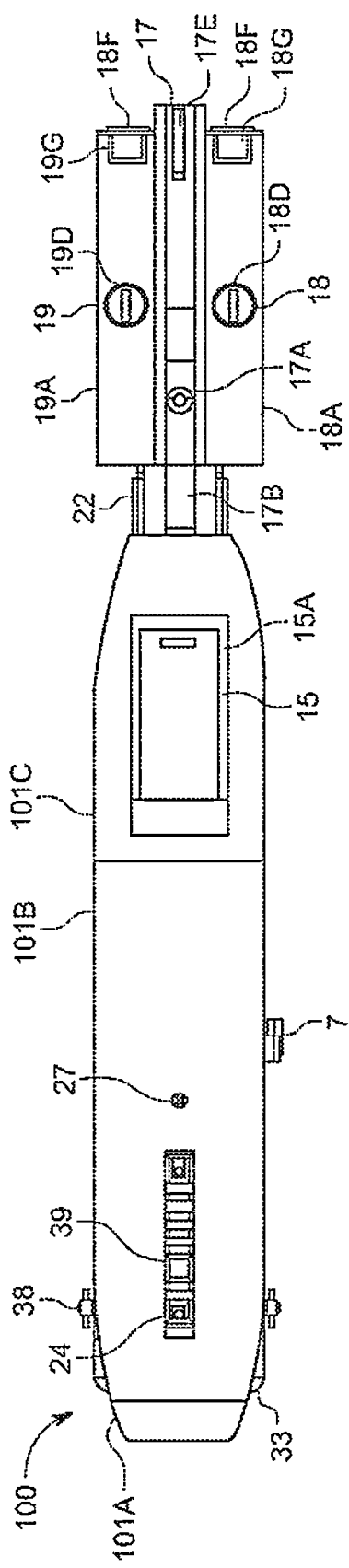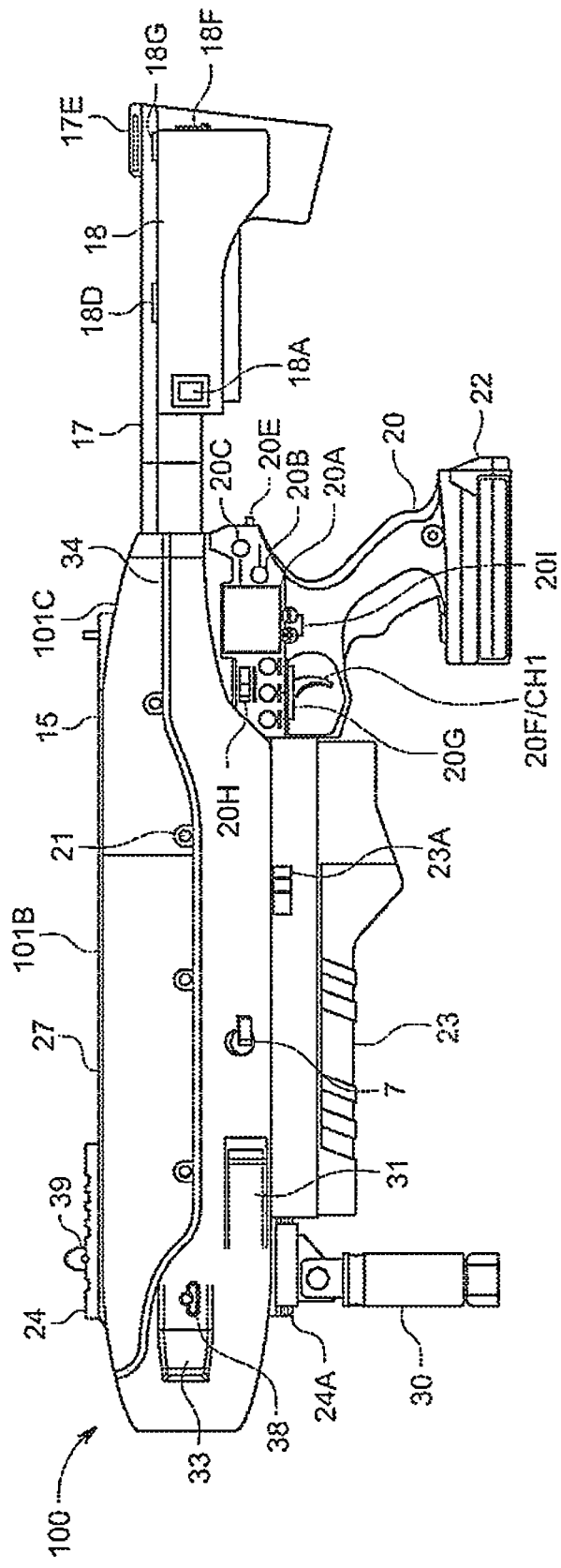

TACTICAL TURBINE AEROSOL GENERATOR INTEGRATED WITH AN UNMANNED AERIAL VEHICLE

RELATED APPLICATIONS

This application is a Continuation-In-Part application and claims priority to U.S. Provisional Patent Application No. 62/856,678, filed on Jun. 3, 2019, and U.S. patent application Ser. No. 16/891,674, filed on Jun. 3, 2020 the contents of which is incorporated herein by reference in its entirety.

FIELD OF DISCLOSURE

The present disclosure relates aerosol generation and, in particular a device and system configured to produce simulated smoke (aerosols) for industrial uses.

BACKGROUND

The generation of synthetic smoke has multiple applications in commercial and tactical control environments. For example, generated smoke can be use in training exercises, crowd dispersal or special effects. Currently, the operational capacity of smoke generating devices is limited with respect to the overall volume of smoke or the continuous output of smoke. During tactical operations, there may be to provide the smoke from various distances or altitudes. The efficient production of the smoke require additional system components. Accordingly, there remains a need for improved comprehensive and efficient way to address the problem of producing a large continuous volumes of smoke at additional distances and altitudes. This need and other needs are satisfied by the various aspects of the present disclosure.

SUMMARY

Some or all of the above needs and/or problems may be addressed by certain embodiments of the disclosure. In accordance with the purposes of the disclosure, as embodied and broadly described herein, the disclosure, in one aspect, relates to an aerosol generator. An embodiment of the aerosol generator can include a solution tank assembly. The solution tank assembly is configured to transport an aerosol solution. The aerosol generator can include a motor device wherein the motor device is configured to vaporize the aerosol solution. The motor device can also expel the aerosol solution from the aerosol generator. The aerosol generator can comprise an engine control unit in electrical communication with the motor device. The aerosol generator can also include a transmitter assembly in electrical communication with the solution tank assembly and engine control unit and configured actuate operation of the aerosol generator. The apparatus can also include an unmanned aerial vehicle (UAV). The unmanned aerial vehicle can include a vehicle body configured to couple to a portion of the aerosol generator. The UAV can comprise a power unit configured to provide lift, thrust and direction to the unmanned aerial vehicle. The UAV can also include a vehicle computer in communication with the transmitter assembly.

Another embodiment of the apparatus can include aerosol dispersal system can include an aerosol generator and device for control. The aerosol generator can comprise a solution tank assembly. The solution tank assembly can be configured to transport an aerosol solution for vaporization. The aerosol generator can further include a motor device. The motor device can be configured to vaporize the aerosol solution and expel the aerosol solution from the aerosol generator. Aerosol generator can also comprise an engine control unit in electrical communication with the motor device. The aerosol generator can include a transmitter assembly in electrical communication with the solution assembly and engine control unit. The apparatus can also include an unmanned aerial vehicle (UAV). The UAV can comprise a vehicle body that couples to the aerosol generator. The UAV comprises a power unit that provides flight and a vehicle computer. The apparatus further comprises a remote control device in communication with the transmitter assembly and vehicle computer.

Additional embodiment of the apparatus can include a tactical turbine aerosol generator which comprises an aerosol dispersal system. The aerosol dispersal system can include an aerosol generator. The aerosol generator can comprise a solution tank assembly. The solution tank assembly can be configured to transport an aerosol solution for vaporization. The aerosol generator can further include a motor device. The motor device can be configured to vaporize the aerosol solution and expel the aerosol solution from the aerosol generator. Aerosol generator can also comprise an engine control unit in electrical communication with the motor device. The aerosol generator can include a transmitter assembly in electrical communication with the solution assembly and engine control unit. The apparatus can also include an unmanned aerial vehicle (UAV). The UAV can comprise a vehicle body that couples to the aerosol generator. The UAV comprises a power unit that provides flight and a vehicle computer. The apparatus further comprise a remote control device in communication with the transmitter assembly and vehicle computer. The apparatus also comprises a landing platform for fueling and/or recharge of the UAV and aerosol generator.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several aspects of the disclosure and together with the description, serve to explain the principles of the disclosure.

FIG. 1 depicts a top view of the aerosol generator.

FIG. 2 depicts side view of the aerosol generator.

DETAILED DESCRIPTION

Figure 3:
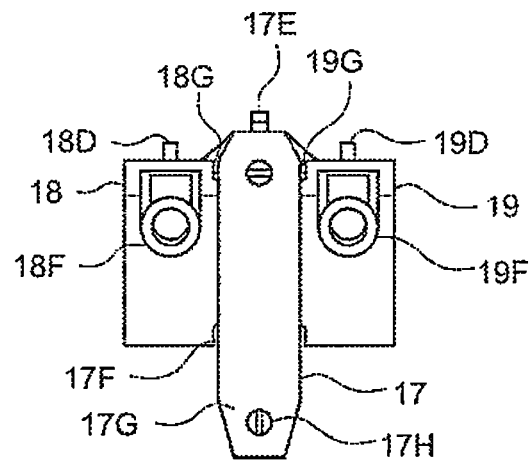
FIG. 3 depicts a rear view of the aerosol generator.

The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods, and materials are now described.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

DETAILED DESCRIPTION

As briefly described above, the present disclosure relates, in various aspects, to a tactical turbine aerosol generator. The aerosol generator can be a modular-compact-hand-held-aerosol-generator. In one aspect, the aerosol generator can be driven by a tether-control-system (remote-control). The aerosol generator can comprise a tubular housing. Further, the aerosol generator can be powered by both an internal combustion system and an electrical battery. The aerosol (smoke) generated by the aerosol generator 100 can be provided by peripheral tanks coupled to the tubular housing. In another aspect, additional aerosol solution or fuel can be provided to the aerosol generator by an auxiliary container system that couples to the aerosol generator. The aerosol solution can be a liquid that is formulated to produce a gas with particulates when sufficient heated. The vaporized aerosol solution can yield smoke, gaseous pesticides, or the like. In operating the aerosol generator, aerosol solution is pumped from peripheral tanks or auxiliary system at one end of the tubular housing. The aerosol solution is vaporized and emitted when the solution comes in proximity to an internal combustion turbine. The heat from the turbine vaporizes the aerosol solution. In addition, the rotary motion of the turbine produces an air force that expels the vaporized solution away from the tubular housing, as the vaporized solution exits nozzles located at the opposite end of the tubular housing.

As shown in FIGS. 1 and 2, the aerosol generator 100 can comprise an external housing 101. The external housing 101 can comprise a tubular shape, while other geometric configurations are considered. In a further aspect, the external housing can be partitioned in to panels. As shown in FIGS. 1 and 2, the housing 101 can comprise three panels 101A, 101B, and 101C. The panels can be coupled together for form a unitary housing 101. The panels can be held in place by a plurality of D rings 21. Additional types of fasteners 25, 35 other than D-rings can be used as well. The portioned configuration for the housing panel can allow for easier maintenance, reconfiguration, or swapping of internal components. In yet another aspect, the housing 101 can include one or more orifices 27 that allows wires to pass through the housing 101. These wires can be connected to various internal components of the aerosol generator 100. The housing can also include a thermal coating 36 as a safety measure from heat in proximity to the nozzle 2.

The external structure of the external housing can include external fixtures 24, 24A, such as latches, hooks, or rails. These external fixtures 24, 24A allow for peripheral items to be affixed to the external housing 101 and provide additional functionality for the user. For example, a night scope, infrared scope, or additional lighting can be affixed to the housing 101. The external housing 101 can further include strap connection fixtures 38, 39. The strap connection fixtures can be mountings structured to allow a carrying strap to be connected to the housing 101. An external strap (not shown) can allow the user additional comfort when the strap is placed on the shoulders to distribute the weight of the entire aerosol generator 100. In yet another aspect, the housing 101 can also include a flashlight 33. The flashlight 33 can be a high-intensity flashlight with selectable capabilities for both general use and tactical capabilities. The housing 101 can also include an LED light strip 34. The LED light strip can be multiple colors to provide lighting applications or aesthetics for the housing 101. The light strip 34 can provide a visual indicator as to the system mode for the aerosol generator 100. For example, a particular color can be associated with the amount or speed at which aerosol is produced.

The external surface of the housing can further include a visual display 15. The visual display 15 can serve as a graphical user interface (GUI) to make selections for the operation of the aerosol generator 100. In a further aspect, the display can be protected from damage using a cover 15A made of a durable material such as rubber or silicone. Further, the cover 15A can be further secured to the housing 101 by the using of a framing cover magnet 15B and frame magnet 15C, See FIG. 4. The magnet configuration can allow the user to quickly access the GUI while still maintain suitable protection for the GUI in the display 15.

The external housing 101 can also include certain safety features that maintain and protect the operation of the aerosol generator 100. The housing can define additional orifices that can be used to maintain the temperature of the aerosol generator 101. For example, an air channel 31 can be located in proximity to the internal combustion turbine, not shown. The air channel 31 proximity of the turbine fuel to the natural grip of the user provides additional comfort by reducing the possibility of overheating. For additional means to increase user comfort, a tactile grip 30 can be used. The housing can also comprise the fuel tank 23 for a turbine (not shown). The fuel tank 23 can be disengaged from the housing 101 by actuating the release latch 23A.

The aerosol generator can further comprise a solution tank assembly 17. The tank assembly can include at least two tanks 18, 19 configured to hold aerosol solution. The peripheral tanks 18, 19 can be coupled to the rear of the housing 101 using fasteners 17A, 18A, and 19A. In a further aspect, these fasteners can be D-rings, screws or bolts. In the current embodiment, the D-rings allow for quicker transition in removing the tanks 18 and 19 from the housing 101. In addition to fasteners, the external surface of the solution tank assembly 17 can include, a dual pump access door 17B and a sling harness fixture 17E. Similar to the fixtures 38 on the tubular housing 101, the sling harness fixture 17E is an additional fixture that can be used as a connection point for a carrying strap or harness. The internal cavity of the peripheral tanks 18, 19 can be accessed by removing the container caps 18D and 19D. In the event that the auxiliary container assembly (backpack) 200 (not shown) is used, the user can connect hoses from the auxiliary container assembly 200 to the couplings 18F, 19F located at the rear of the peripheral tanks 18, 19. As shown in FIGS. 1-3, the solution tank assembly 17 can also include additional latch mechanisms 18A, 19A, 18G and 19G to release the peripheral solution tanks 18, 19 (and associated tubing—not shown) from the solution tank assembly 17. Also shown in FIG. 3, the solution tank assembly 17 can include guide rails 17F for coupling of additional peripheral devices; a butt plate 17G to provide additional comfort to the user; and an associated fastener 17H for the butt plate.

Figure 4:
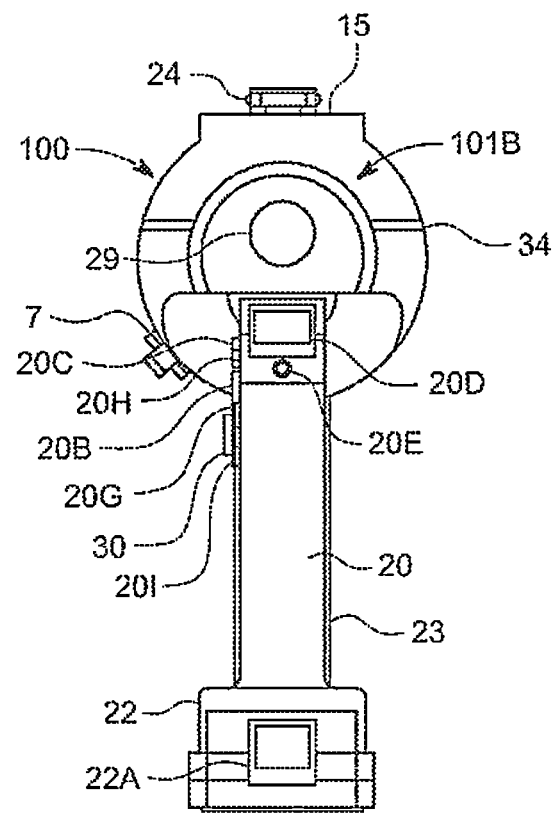
FIG. 4 depicts a rear view of the aerosol generator wherein the solution tank assembly is removed.

As shown in FIG. 2 and FIG. 4, the aerosol generator 100 can include a transmitter assembly. The transmitter assembly 20 can serve as the external actuation for the aerosol generator 100. Similar to the display/GUI 15, the transmitter assembly can include and auxiliary display 20A. The auxiliary display 20A can provide limited functionality and display capabilities compared to the display/GUI 15. In another embodiment, the auxiliary display 20A can provide additional information that is not displayed on the display/GUI 15. The operation of the auxiliary display 20A can be manipulated by select buttons 201. In a further aspect, the aerosol generator 100 can be customized to define which information is presented on the display/GUI 15 and the auxiliary display 20A. In another aspect, the operation of the aerosol generator 100 can be modified by actuating the mode buttons 20B adjacent to the auxiliary display 20A. The triggering assembly 20 also includes auxiliary channels 20G. The auxiliary channels 20G can include ports to allow inputs for additional peripheral devices. For example, the peripheral devices could include additional lights or a camera. The trigger assembly 20 can include a tank-valve switch 20H, the tank valve switch can be used to toggle between a single or multiple peripheral tanks 18, 19 used.

The user can actuate the power for the aerosol generator 100 by pressing the power button 20C. One of the power sources provided to the aerosol generator can comprise a battery 22. The battery 22 can be a 40V battery configured to supply power to all of the electrical components of the aerosol generator 100. The battery 22 can connected and disconnected by actuating the battery quick release button 22A. Once the aerosol generator is powered, a user can expel aerosol from the housing 101 by squeezing the trigger. In a further aspect, the triggering mechanism can be configured to adjust the flowrate of the aerosol expelled based on the amount of pressure (throttling) applied to the trigger 20F.

The transmitter assembly 20 adds the functionality of allowing the aerosol generator 100 to be controlled via a remote-control device 500. In one aspect, when the transmitter quick latch 20D is placed in the tether mode, the aerosol generator 100 can receive signals from the antennae 20E facilitating remote control from an external source. The remote capability allows the aerosol generator 100 to be coupled to other mechanisms that do not require human use. For example, the aerosol generator can be coupled to an unmanned air vehicle (UAV). With these remote capabilities, tactical or commercial uses can be implemented by a remote user. With regards to tactical capabilities solutions, crowd dispersal could be implemented when the aerosol generator produces smoke while coupled to a drone. Commercial or industrial remote operations could include aerial crop fertilization using a drone as well. Further, while these remote operations are being performed by aerosol generator, the transmitter's assembly can transmit and receive data to maintain or adjust the operation of the aerosol generator 100.

Figure 5:
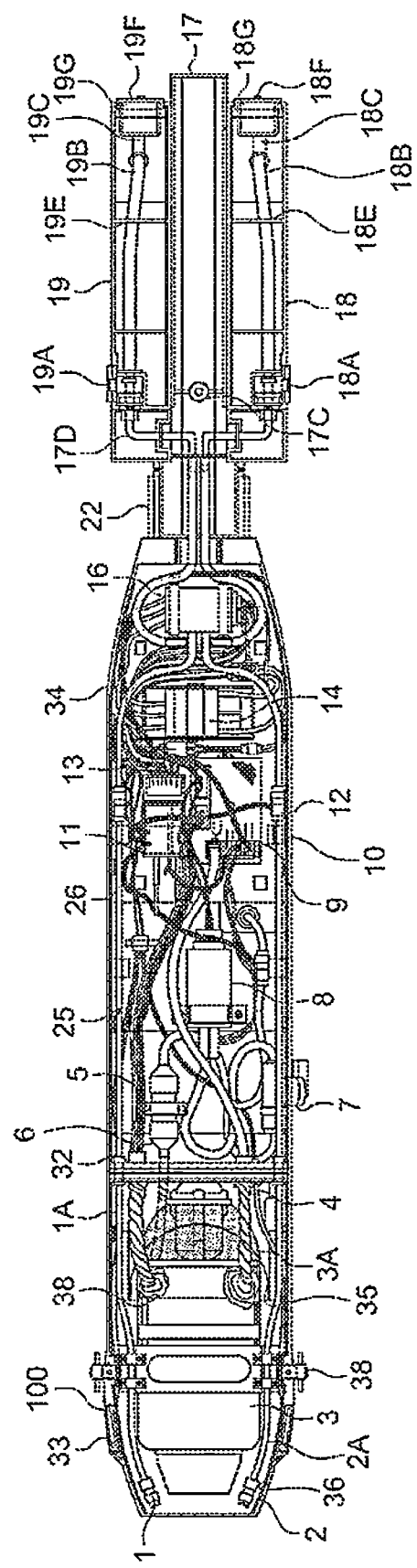
FIG. 5 depicts a top cross-sectional view of the aerosol generator.
Figure 6:
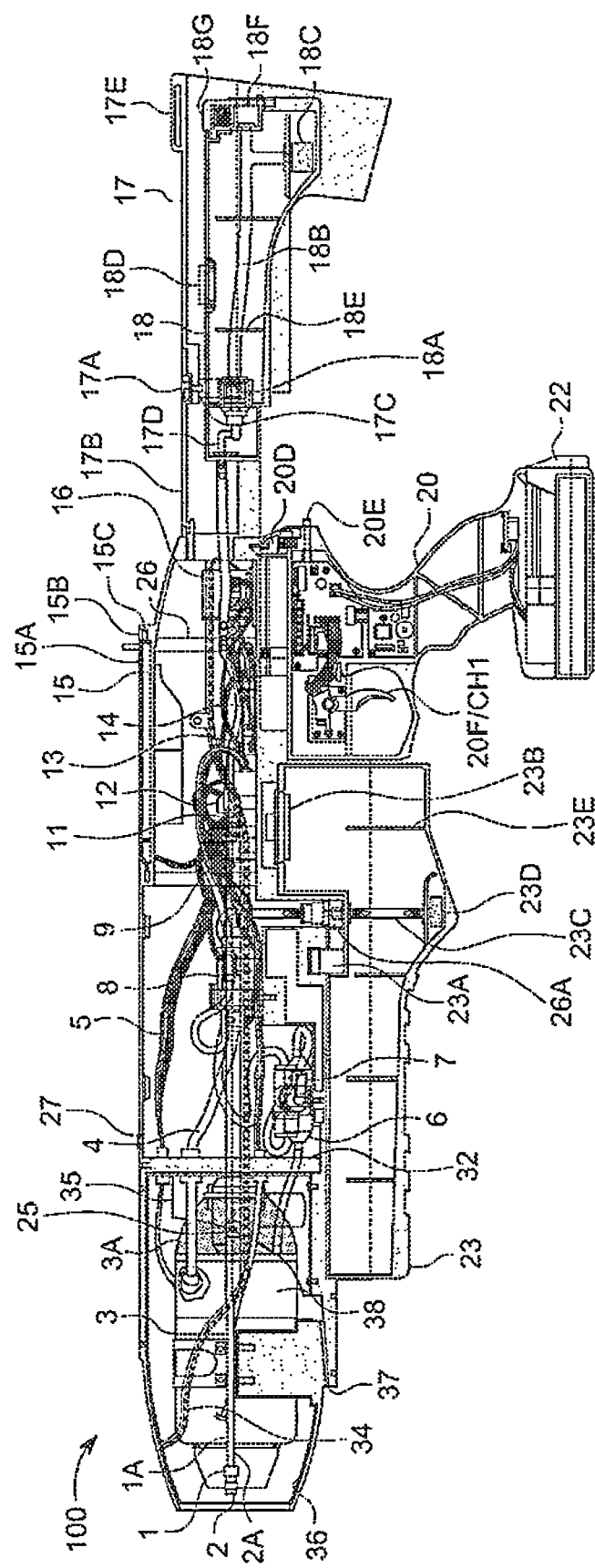
FIG. 6 depicts a side cross-sectional view of the aerosol generator.
Figure 7:
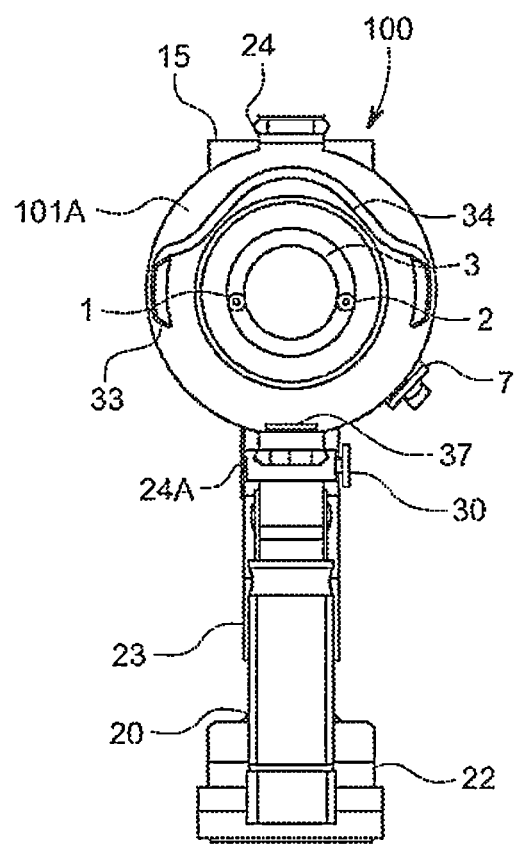
FIG. 7 depicts a front view of the aerosol generator.

FIGS. 5 and 6 depict cross-sectional views of the aerosol generator 100. FIG. 7 depicts a front view of the aerosol generator. As discussed earlier, aerosol solution flow can initiate in the peripheral tanks 18, 19. The aerosol solution can be pumped by in to the solution pickup 18C. The solution pickup 18C can be the opening of a solution feed line 18B. In another aspect, the peripheral tank 18 can include a baffle 18E. The baffle 18E can be used to reduce the fluid motion of the aerosol solution. The baffle can comprise walls that are oriented in the internal cavity of the peripheral tanks 18, 19. The solution feed line 18b traverses peripheral tank 18 and enters connection pipes 17D, passing through stock port 29, connecting to the dual pump valve 16 at connector 17C. The dual pump valve 16 pumps the aerosol solution through the solution lines 1A and 2A. In one aspect, the solution lines 1A, 2A can be coupled to fluid gage 12. The fluid gage 12 can measure with flow-meters the levels of the aerosol solution. The fluid gage 12 can provide data to the remote-control integrated telemetry receiver 11. After exiting, the fluid gages, the solution lines 1A, 2A can terminate at the spray nozzles 1, 2.

The aerosol generator 100 can further include an internal combustion motor device 3. In one aspect the motor device can be a turbine 3. The turbine 103 can produce heat to vaporize the aerosol solution and provide a propelling force expel the vapor from the aerosol generator 100. In particular, the valve pump 16 pushes the aerosol solution through the solution lines 1A, 2A. While in proximity to the turbine 103, the heat generated by the turbine 3 can vaporize the aerosol solution in the solution lines 1, 2. The turbine can also include a drain pan 37 to catch overflow fuel powering the turbine. In an alternative embodiment, the turbine can be configured to be a hybrid-powered turbine engine. The hybrid-powered turbine engine can be powered by both combustible fuel and/or electricity. For example, when the aerosol generator 100 is powered but idling (trigger is not being squeezed), the turbine can operate off of electrical power. When a higher rating of power is warranted the engine control unit 9 can switch the turbine 3 to operating as an internal combustion engine, using the combustible fuel.

The fuel for the turbine 3 can be provided by the fuel tank 23. In a further aspect the fuel tank 23 can include baffles 23E. Similar to the baffles 18E in the peripheral tank, the baffles 23e in the fuel tank can regulate the fuel flow into the tank. Access to the fuel tank can be provided by an orifice in the fuel tank that can be covered by a fuel tank cap 23B.

In providing fuel to the turbine, fuel can be drawn into the fuel pickup 23D. The fuel pickup 23D can be a terminal end in a fuel line 23C that also comprises a filter. The fuel can be pumped to the turbine 3 via a fuel pump 8. In a further aspect, the fuel provided to the turbine 3 can pass through a fuel filter. The fuel filter 6 can be a screen that remove foreign object debris (FOD) from the fuel.

As an additional safety mechanism, aerosol generator can include a safety petcock 7. The safety petcock 7 can be a valve that is accessible from the external housing 101. To reduce or eliminate fuel flow to the turbine 3, the safety petcock can be manually manipulated to shutoff fuel flow as a safety precaution. In a further aspect, the aerosol generator 100 can include a FOD screen 3A. FOD screen 3A can be used to reduce debris that may have entered the internal cavity of the external housing 101 via the air channel 31. In another aspect, the internal cavity of the external housing can include a firewall 32. The firewall 32 can be a material placed between the turbine 3 and electrical components. The firewall 32 can also safeguard low pressure airflow of the turbine 3.

In addition to the internal combustion components of the turbine system 3, can also include electrical components to initiate combustion and regulate continual application. In a further aspect, the turbine can include a starter cable 5. In one aspect, the starter cable provides an initial electrical spark to initiate the combustion within the turbine. The electrical spark can be supplied by the battery 22. In a further aspect, the turbine 3 can include an engine control unit (ECU) 9. The ECU can function as a control the electrical components of the system. For example, the turbine 3 can be in electrical communication via a data cable 4 to supply electrical information from the ECU. The ECU 9 can be coupled electronically to the receiver 11. In a further aspect, data received by the receiver 11 can be communicated and processed by the ECU. In a further aspect, the ECU 9 can provide responsive output to the other system components of the aerosol generator 100 via the receiver 11. The ECU 9 could also be in electrical communication with a battery elimination circuit BEC 13. The BEC 13 can regulate powering of the receiver and valve pump 16. In a further aspect, the BEC can operate in conjunction with the ECU to regulate the power requirements and functional operation of the other electrical components of the aerosol generator 100. In a further aspect, the electrical components can include and electronic speed-controller (ESC) (14). The ESC 14 can work in tandem with the BEC to provide power and speed control to the dual pump valve.

Figure 8:
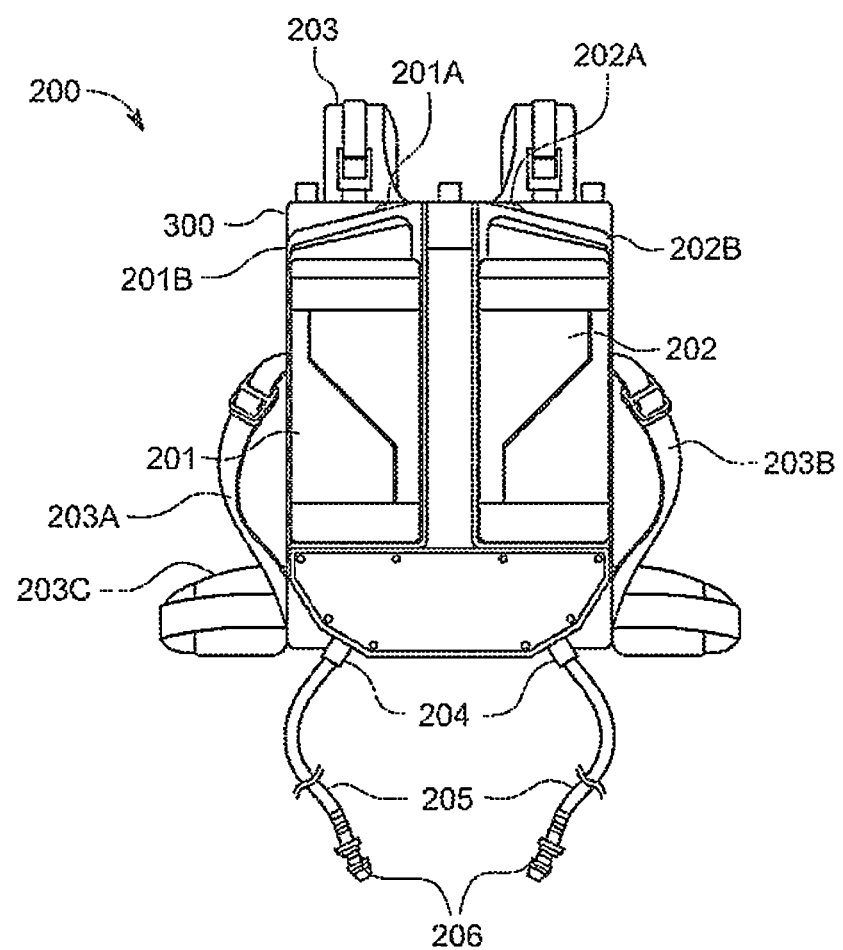
FIG. 8 depicts a front view of the auxiliary container system.
Figure 9:
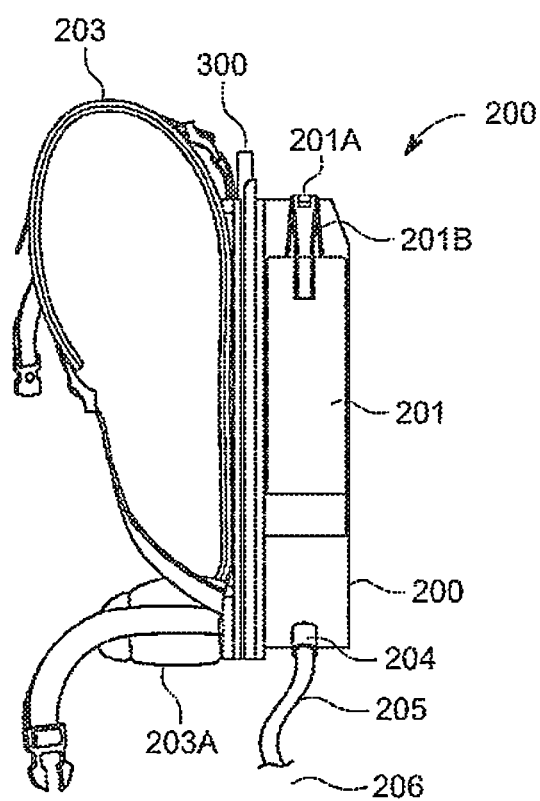
FIG. 9. depicts a side view of the auxiliary container system.

FIG. 8 and FIG. 9 depict a front view and a side view of an auxiliary container system 200. The auxiliary container system 200 can be used to increase the amount of aerosol solution and or motor fuel accessible to the user during using. The auxiliary container system 200 can also provide ease of transport for the solution and fuel. In one aspect, the auxiliary container 200 can include a harness 203. The harness 203 can comprise straps 203A, 203B. The straps 203A, 203B can rest on the user's shoulders to evenly distribute the weight of the liquids. In another aspect, the harness 203 can comprise an embodiment with a single harness. In a further aspect, the harness 203 can include hip pads 203C. The hip pads 203C can be used to provide additional comfort and ergonomic support for the user.

The auxiliary container system 200 can include one liquid tank. As shown in FIG. 8, the auxiliary container system 200 can include multiple liquid tanks, an auxiliary fuel tank 201, and an aerosol solution tank 202. In a further aspect, each tank can include a baffle structure (not shown) oriented in the internal cavity of the respective tanks. The baffle structures can be internal walls used to reduce the amount of motion of the fluids in the tank, mitigating the amount of stress placed on the user while carrying the auxiliary container system 200.

In a further aspect, the auxiliary fuel tank 201 can include a latch 201a that allows the user to couple and de-couple the fuel tank from the harness 203. In one aspect, the latch 201a can be configured with a bias mechanism such as a spring to allow the latch to quickly engage or disengage the fuel tank from the harness 203. The auxiliary fuel tank 201 can further include a handle 201b that allows the user to: 1) carry the fuel tank when the auxiliary fuel tank 201 is disconnected from the harness, or 2) as an additional method of transporting the auxiliary container system 200, when the fuel tank is connected to the harness 203. Similarly, the aerosol solution tank 202 can include the sample components as the auxiliary fuel tank 201. In particular, the solution tank can include a latch comprise a latch 202a to couple and decouple the solution tank 202 from the harness 203. In addition, the solution tank 202 can include a handle 202b for carrying the solution tank. In a further aspect, the harness 203 can include a hover glide-mount that functions as a container stabilization device. The hover glide mount 300 can be plurality of springs that are coupled to the harness. The orientation of the springs can be used to counteract the weight or force-moments generated by the liquids in the auxiliary tanks 201 202.

The auxiliary container system 200 can be couple to the aerosol generator 100 by the use of hoses 205A, 205B. The one end of a fuel hose 205A can be coupled to the auxiliary fuel tank 201 by fuel tank coupling 204A and the opposite end can be connected to a fuel tank quick release coupling 206B. Similarly, the one end of a solution hose 205B can be coupled to the solution tank couplings 204B and the opposite end can be connected to a solution tank quick-release coupling 206B. The quick-release couplings for the fuel tank and the solution tank can be used to efficiently engage or disengage the respective tanks from the aerosol generator. For example, the quick-release couplings allow the user to quickly couple the fuel hose 204A or solution hose 204B to the couplings 19F located on the external surface of the solution tank assembly 17. In a further aspect, when the auxiliary container system 200 is coupled to the aerosol generator 100, either of the solution tanks 18-19 can be disengaged from the solution tank assembly 17. The solution tank quick-release coupling 206B can be connected to the quick release couple coupling 18A/19A in the solution tank assembly 17. In another aspect, when coupling the auxiliary fuel tank 201 to the aerosol generator, the fuel tank 23 can be disengaged from the aerosol generator 100. The fuel tank connector 26A can be coupled to the quick release coupling 23A in proximity to the turbine 3 as shown in FIG. 6. In yet a further aspect, the auxiliary container system 200 can be configured to house approximately 3 gallons of liquid for a single tank or between the fuel tank and solution tank.

Figure 10:
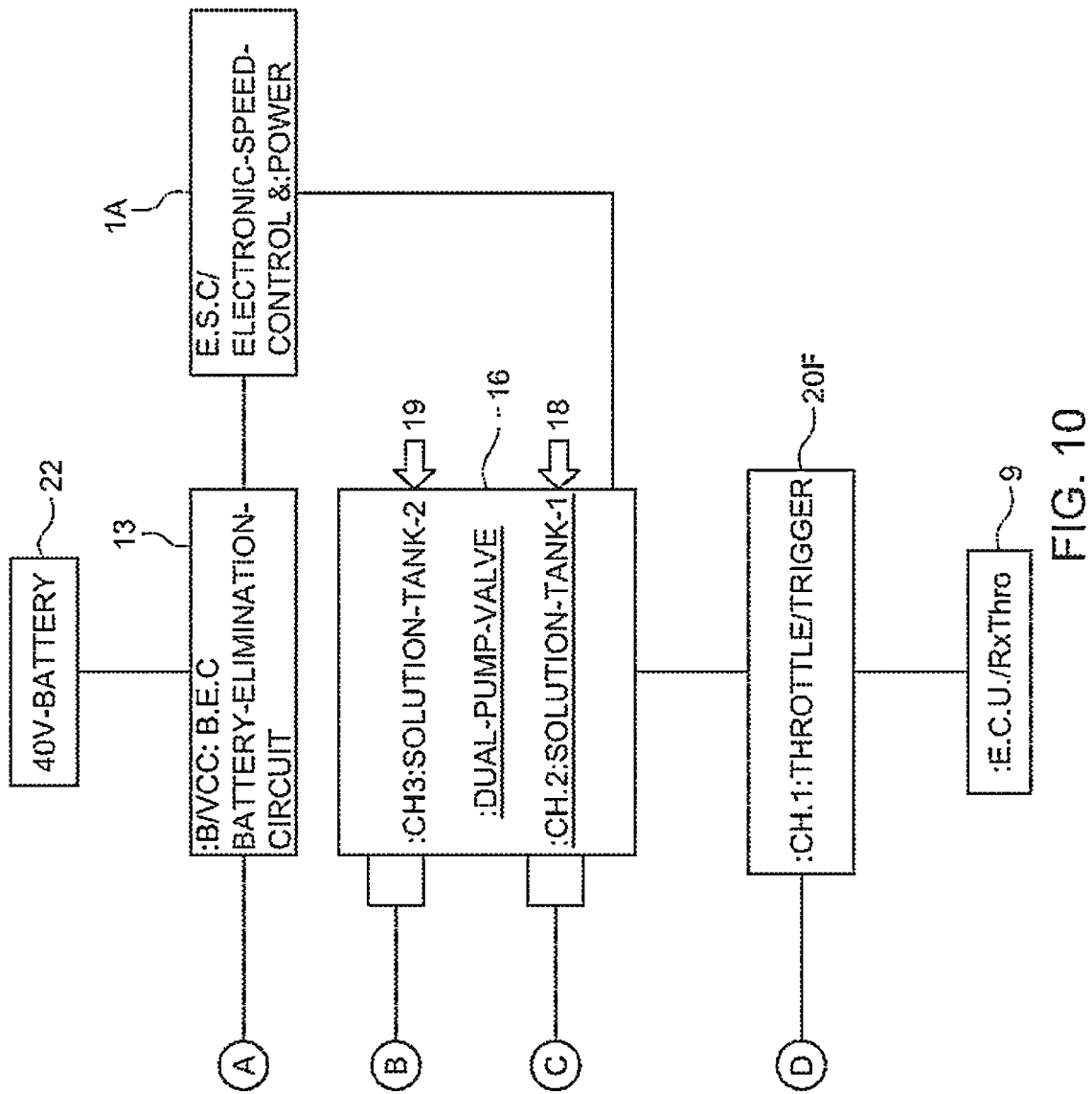
FIG. 10 depicts and electrical schematic of the integrated telemetry receiver.

FIG. 10. Depicts an electrical schematic of a telemetry receiver 11. The receiver can serve as the communication bus for the aerosol generator 100 by completing telemetry functions for the aerosol generator 100. For example, the telemetry functions can be completed by sending and receiving a plurality of data from sensors (not shown) located at various components of the aerosol generator. The receiver 11 can be configured to receive and transmit data to the sensors of the aerosol generator 100 subcomponents components via a retractable antennae 11A. The antennae can be retractable to aid increasing signal strength and while maintain functionality to mitigate damage to the antennae. The antennae 11A can rout control data through the engine control unit (ECU) 9 (not shown) to regulate the functions of the turbine 3. As further shown in FIG. 10, the receiver 11 can include a flow meter 11B that can determine the fuel levels or flow rates from fuel pump 8. The receiver 11 can include solution tank flow meters 11C, 11D to measure the flow aerosol solution flow rates through the nozzles 1A, 2A. In a further aspect, channels of the receiver 11 can be configured to received data form the lighting arrangements on the aerosol generator 100, such as the high lumen flashlights 33 or the Red-Green-Blue (RGB) light emitting diode (LED) strips 34. The receiver 11 can also receive and transmit data from the two solution tanks 18, 19. In addition, data from the fuel pump 6 connected to the aerosol solution tanks 18 and 19 can provided to the receiver 11. Electrical power can also be paired through the receiver 11. For example, data from the battery elimination circuit (B.E.C) 13, electronic speed control 14, the engine control 9 and battery 22 can be electronically coupled to provide necessary data to the receiver for subsequent processing. Further, the operation of the throttle and trigger 20F/CH1 can provide information to the receiver 11.

Figure 11:
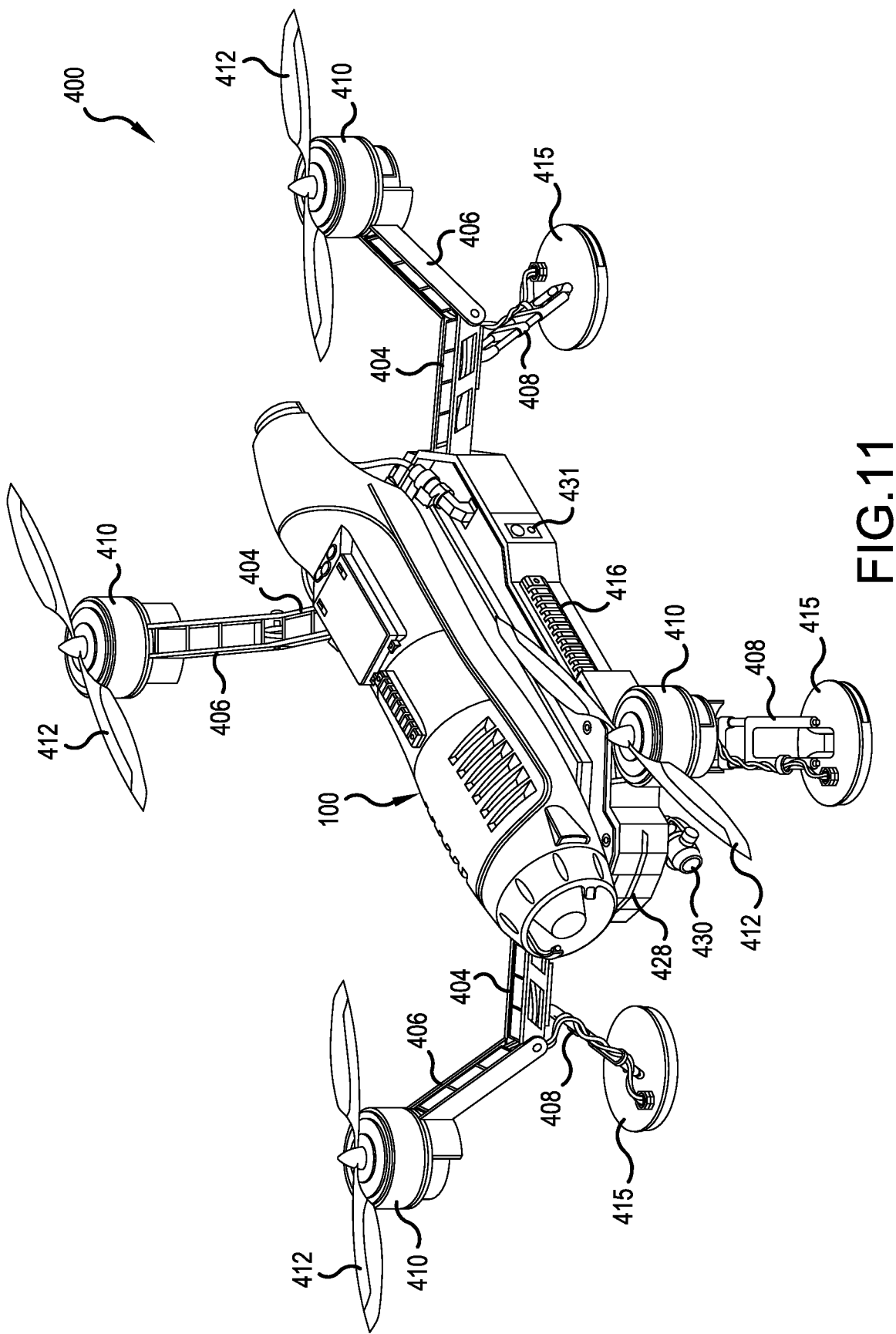
FIG. 11 depicts an isometric view of the aerosol generator coupled to an unmanned aerial vehicle (UAV).
Figure 12:
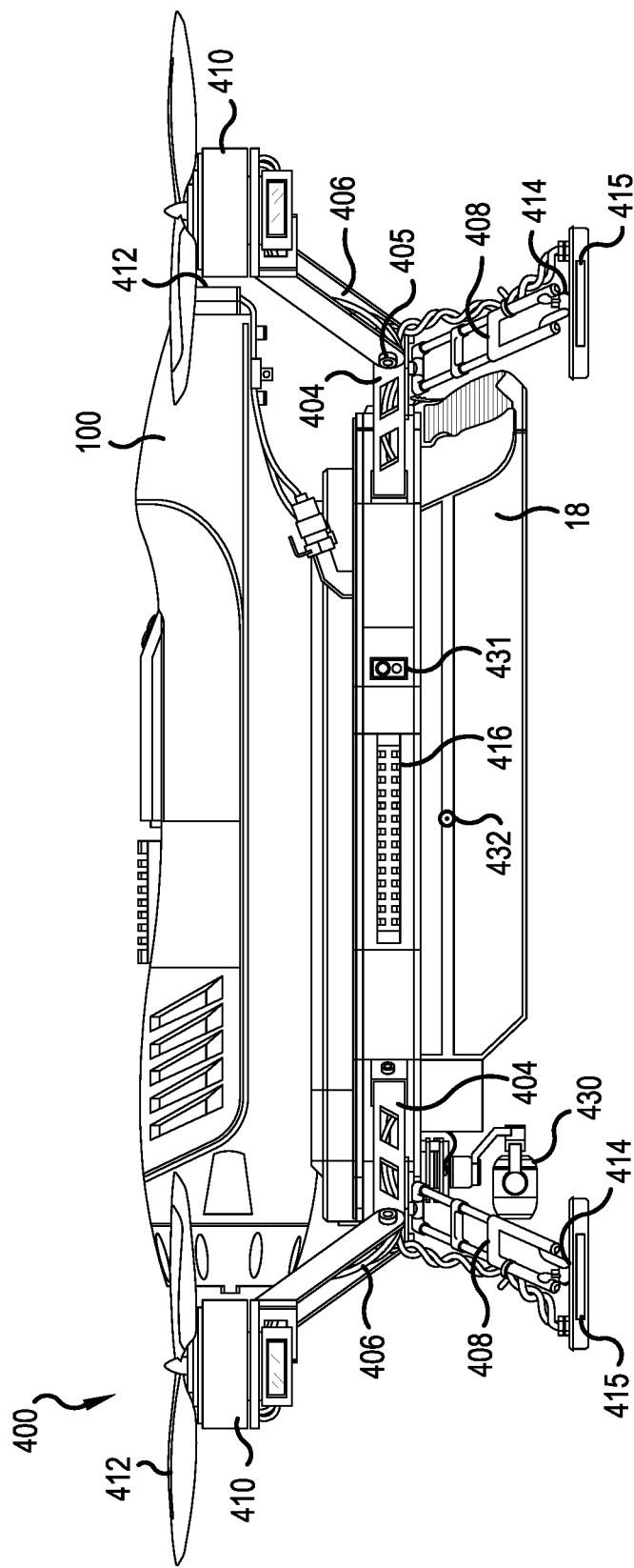
FIG. 12 depicts a left side view of the aerosol generator coupled to an unmanned aerial vehicle (UAV).
Figure 13:
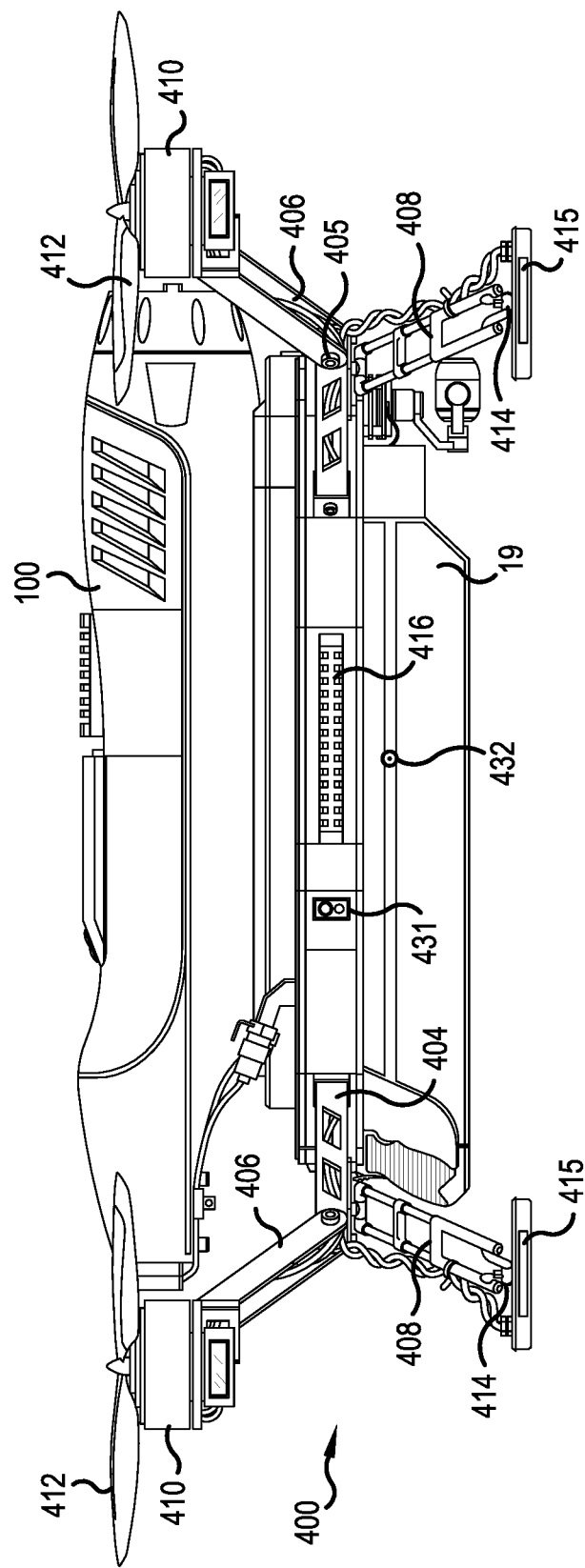
FIG. 13 depicts a right view of the aerosol generator coupled to an unmanned aerial vehicle (UAV).
Figure 14:
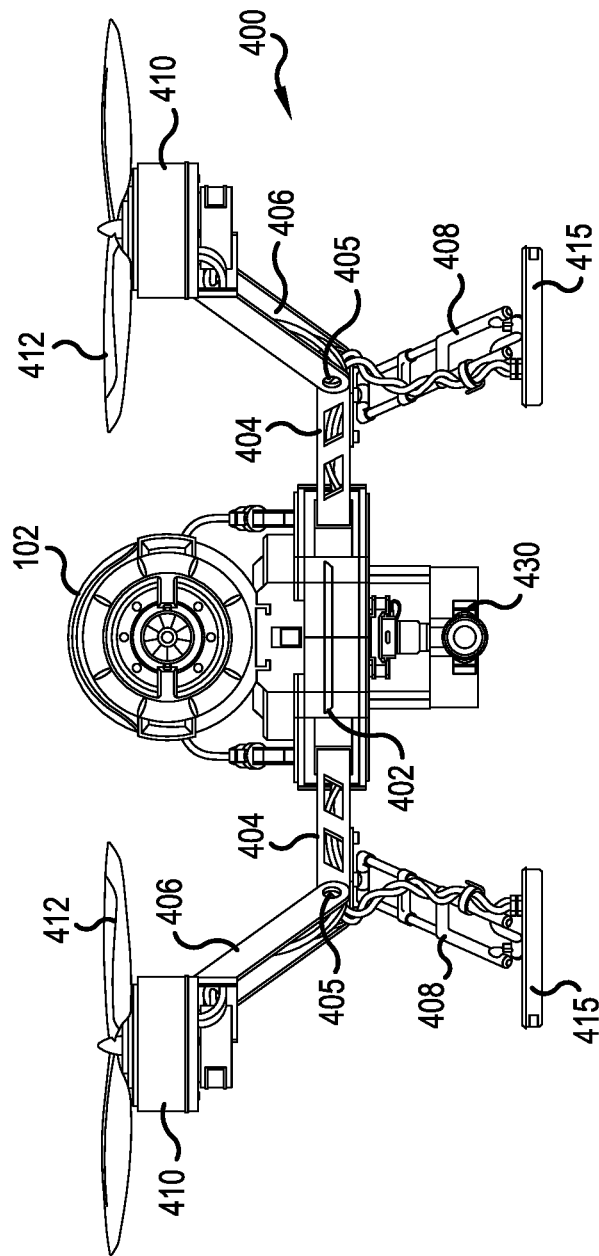
FIG. 14 depicts a front view of the aerosol generator coupled to an unmanned aerial vehicle (UAV).

As mentioned earlier, there can be another embodiment where the aerosol generator 100 can be coupled to an unmanned aerial vehicle (UAV) 400 as shown in FIG. 11. In one aspect, the UAV 400 can be a drone. To facilitate coupling the aerosol generator to the UAV 400, the aerosol generator 100 can be configured with a modular assembly, such that certain components can be removed to allow the aerosol generator 100 to be coupled to the UAV 400. For example, as shown in FIG. 2, the tactile grip 30, fuel tank 23, manual trigger 20F and solution tank assembly 17 which includes the two tanks 18, 19, can be removed.

As shown in FIGS. 12-16, the UAV 400 can comprise a fuselage 402 that functions as the main body of the UAV 400. Extending from the fuselage 402 can be a plurality of fuselage arms 404. The fuselage arms 404 can be oriented to extend symmetrically from the fuselage 402, such that when UAV is inflight, the fuselage can remain level with respect to the ground. The fuselage arms 404 can be members that at one end are coupled to the fuselage 402 and at the other end are coupled to arm connector 405. The arm connector 405 can function as a connection point for the motor arm 406 and landing gear 408.

The motor arm 406 can be a member that extends from the arm connector 405 to the propeller motor 410. The propeller motor can be a rotary motor that is configured to rotate a propeller 412. The propeller 412 can be a plurality of members that extend from the propeller motor. The propeller 412 can be oriented in an angled connections when fixed to the propeller motor 410. As the propellers 412 rotate, the angled orientation and shape of the propellers can cause lift and directional movement such as thrust, pitch, roll, and yaw of the UAV 400. In a further aspect, the propeller motor can be oriented with a gimbal structure (not shown) to prove additional degrees of freedom for controlling the spatial orientation of the propeller 412. The orientation of the propellers 412 during flight can be controlled by the remote control device 500.

In one aspect the propeller motor 410 can be an electric motor. In another embodiment the propeller motor 410 can internal combustion type motor. In yet another embodiment, the propeller motor 410 can be a hybrid configuration that is power by fuel under certain conditions and electrical energy other conditions. Toggling between internal combustion and electrical power can be controlled by the UAV computer (not shown) and/or the remote control device 500. In a further aspect, the propeller motors 410 can be controlled to run in a silent mode. When operating in a silent mode, the motors can operate a rotation that maintains operation below a predefined decibel level. In one aspect, UAV 400 can have a hybrid power configuration, wherein a transition to silent mode can cause the propeller motor 410 to switch from internal combustion operation to operating only on electrical energy, which is quieter.

A second component of the fuselage arm 404 can comprise landing gear 408. The landing gear 408 can be a member where one end extends from the arm connector 405 and the other (landing) end contacts a landing surface. The landing end 414 can comprise a landing gear element 415; the landing gear element can be a pad that expands the surface area of the landing gear end 414. In a further aspect, the land gear pad 415 can comprise an induction coil. In another aspect, the landing end 414 can be spring loaded to distribute forces and reduce the likelihood of damage in the event of an abrupt landing by the UAV 400 at a high velocity. In yet a further aspect, the landing gear 408 and the propeller motor 410 can comprise a plurality of sensors that can detect atmospheric conditions and forces.

Figure 17:
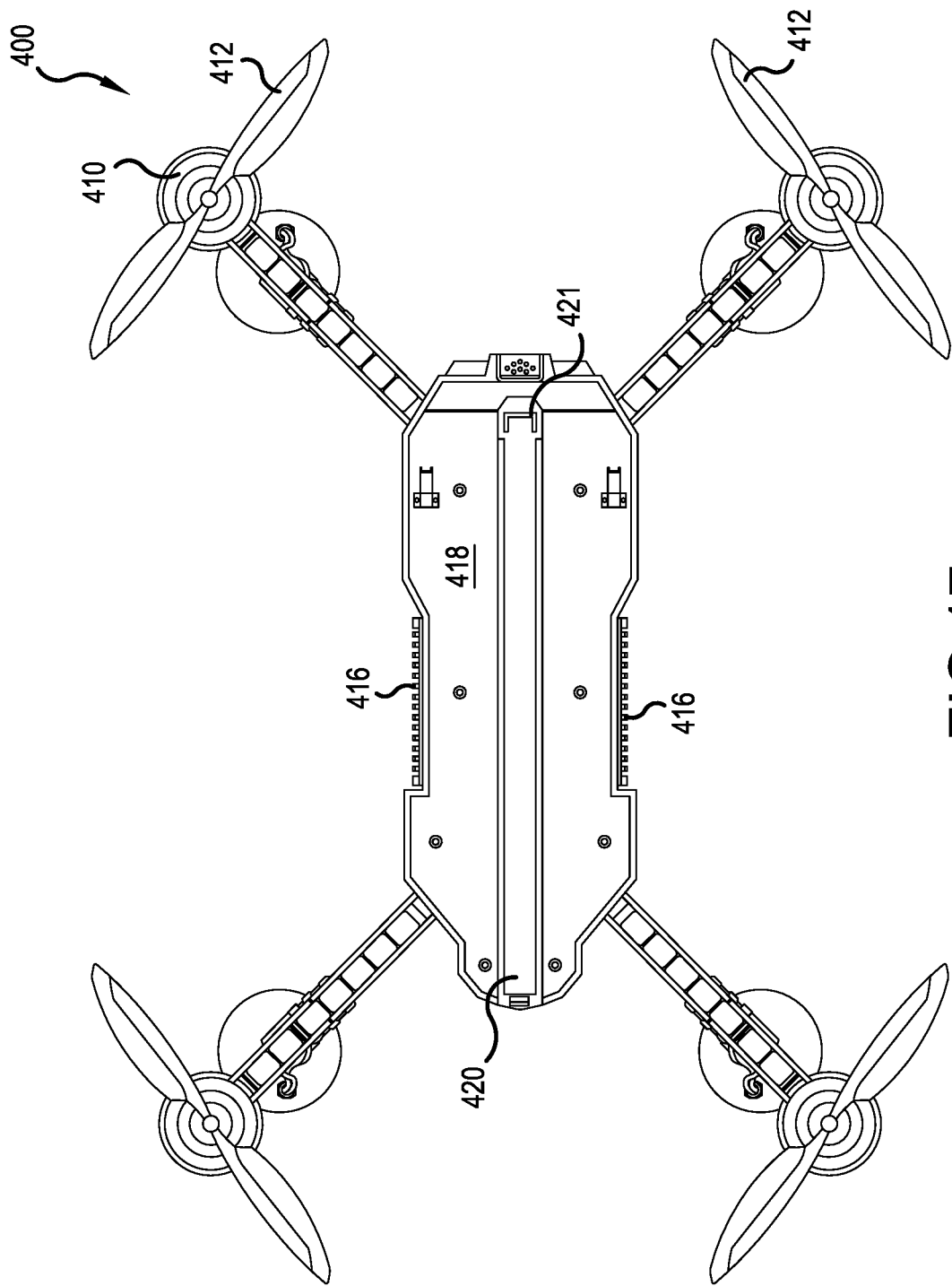
FIG. 17 depicts a top view of the unmanned aerial vehicle (UAV).
Figure 18:
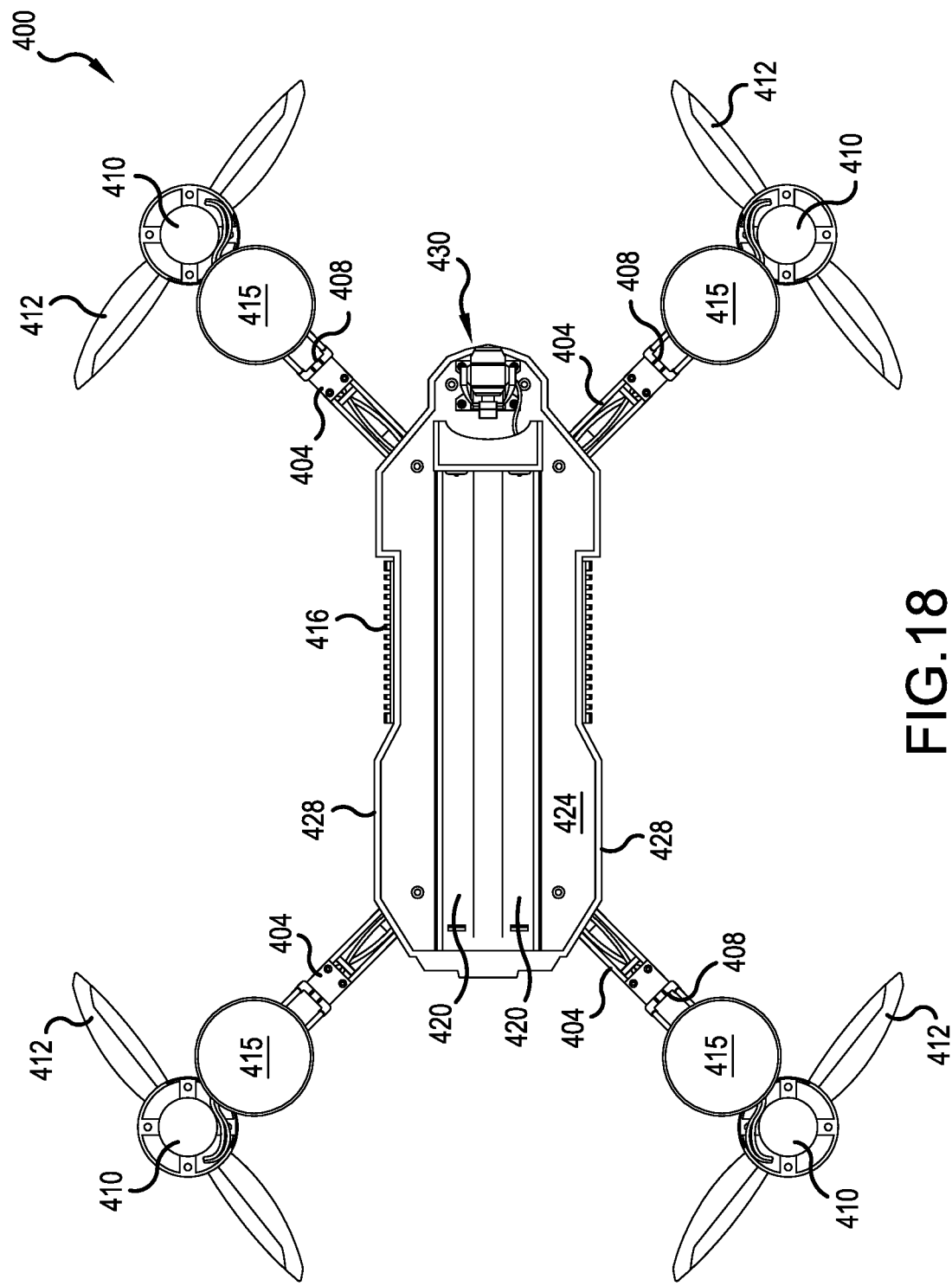
FIG. 18 depicts a bottom view of the unmanned aerial vehicle (UAV).
Figure 19:
FIG. 19 depicts a top view of the alignment rail on the unmanned aerial vehicle (UAV).
Figure 20:
FIG. 20 depicts a side view of the alignment rail on the unmanned aerial vehicle (UAV).

As shown in FIGS. 17 and 18, the fuselage 402 can be planar surface to facilitate coupling with a bottom surface of the aerosol generator 100 after the modular components have been removed. In an aspect, the fuselage 402 can comprise picatinny rails 416 on the sides of the fuselage body to permit additional components to be coupled to the sides of the UAV 100. To further facilitate couple with the aerosol generator 102, the top surface 418 of the fuselage body 402 can define an alignment rail 420 as shown in FIGS. 19-23.

Figure 24:
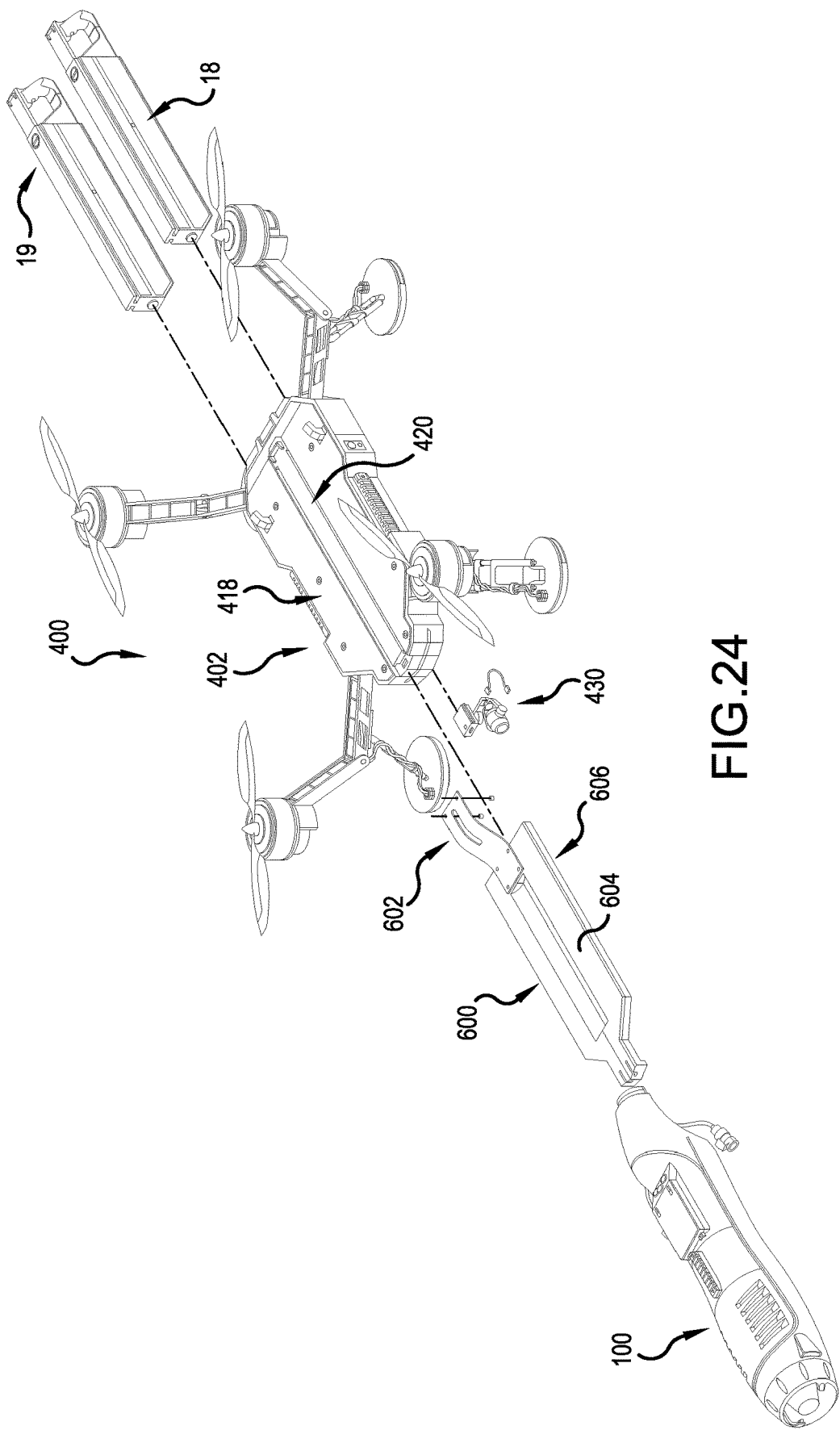
FIG. 24 depicts an exploded view of couplings between the aerosol generator, the unmanned aerial vehicle (UAV) and fuel tanks.

In one embodiment, coupling the aerosol generator 100 to the top surface 418 of the fuselage body 402 could also include a mounting bracket 600. As shown in FIG. 24, the mounting bracket 600 can be a planar member with an angled region 602, wherein the angled region in configured to mate and provide stability to the aerosol generator 102 for the modular components that have been removed. The bottom surface of the aerosol generator 100 can be coupled to the top surface 604 of the mounting bracket 600 and the bottom surface 606 of the mounting bracket can be coupled to the top surface alignment rail 420 of the fuselage body 402.

Figure 15:
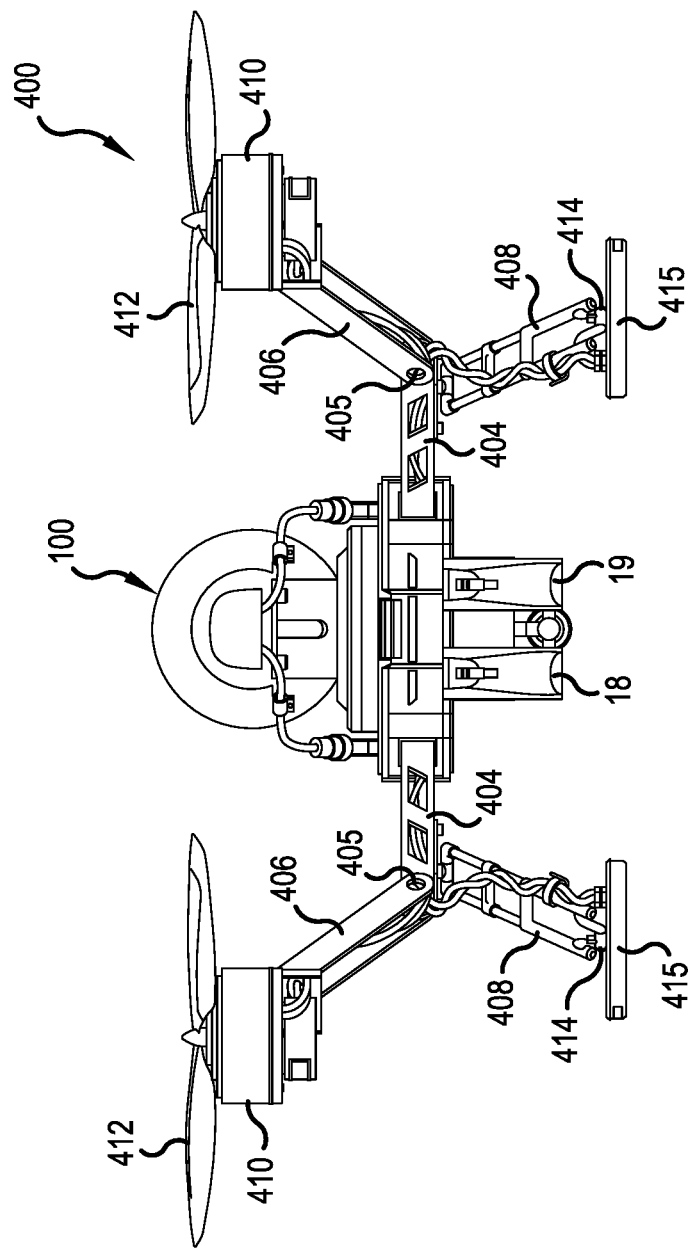
FIG. 15 depicts a rear view of the aerosol generator coupled to an unmanned aerial vehicle (UAV).
Figure 16:
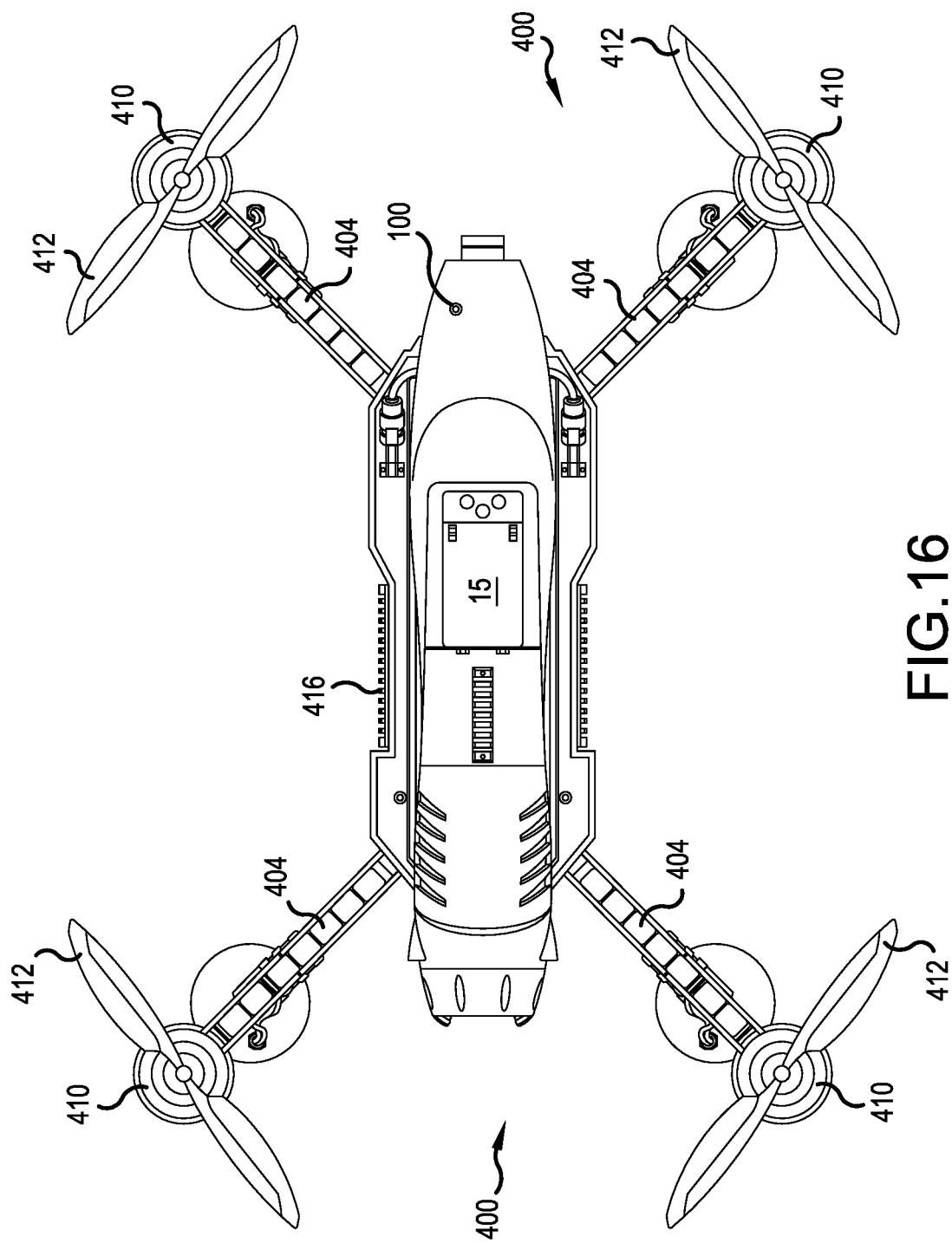
FIG. 16 depicts a top view of the aerosol generator coupled to an unmanned aerial vehicle (UAV).

Similar to mounting the aerosol generator 100 to the top surface 418 of the UAV, the bottom surface 424 of UAV can be couple to the auxiliary solution tanks 18, 19 for fuel, smoke, and or pepper spray. As shown in FIG. 15, the bottom surface 424 of the UAV can comprise a multiple alignment rails 426. Further, a surface on the solution tanks 18, 19 can define a channel or groove that can engage and slide along the bottom surface alignment rails to couple and support the weight of the solution tanks.

The exterior body of the fuselage can comprise of a plastic, metal or carbon composite. In a further aspect, the fuselage 402 can also comprise a camera 430. The camera can be configured to capture still and video images while the UAV 400 is in flight. The image data can be transmitted or stored via the UAV computer. In a further aspect, the camera 430 can be mounted using a gimbal connector to allow the camera to have additional degrees of freedom when capturing images. The fuselage 402 can also comprise a plurality of light arrays 428, wherein the light arrays can receive instructions from the UAV computing device 700 to communicate information via the illumination of the light array 428.

In another embodiment of The UAV 400 can include a leveling system (not shown). For example, the leveling system can be a gyroscope-type device. The gyroscope can be used the determine calibrate the spatial orientation to the UAV 400 relative to the ground. In a further aspect, the UAV computer can an application to determine if the UAV 400 is upside down. Further, after determining that the UAV is upside down or on its side (e.g., the propellers are contacting the ground/terrain), the UAV computing device 700 can run instructions to take a reading from the gyroscope to identify the spatial orientation of the UAV 400. If it is determined that the UAV is upside down, the UAV computing device 700 can then send instructions to one or more of the propellers to effectively flip the UAV on the correct side. In another embodiment, the UAV 400 may contain a telescoping rod (not shown) that can extend from the fuselage body 402 to contact the ground and push the UAV into the proper orientation; this embodiment can be used to mitigate damage to the propellers in an attempt to flip the UAV to the proper orientation.

Figure 25:
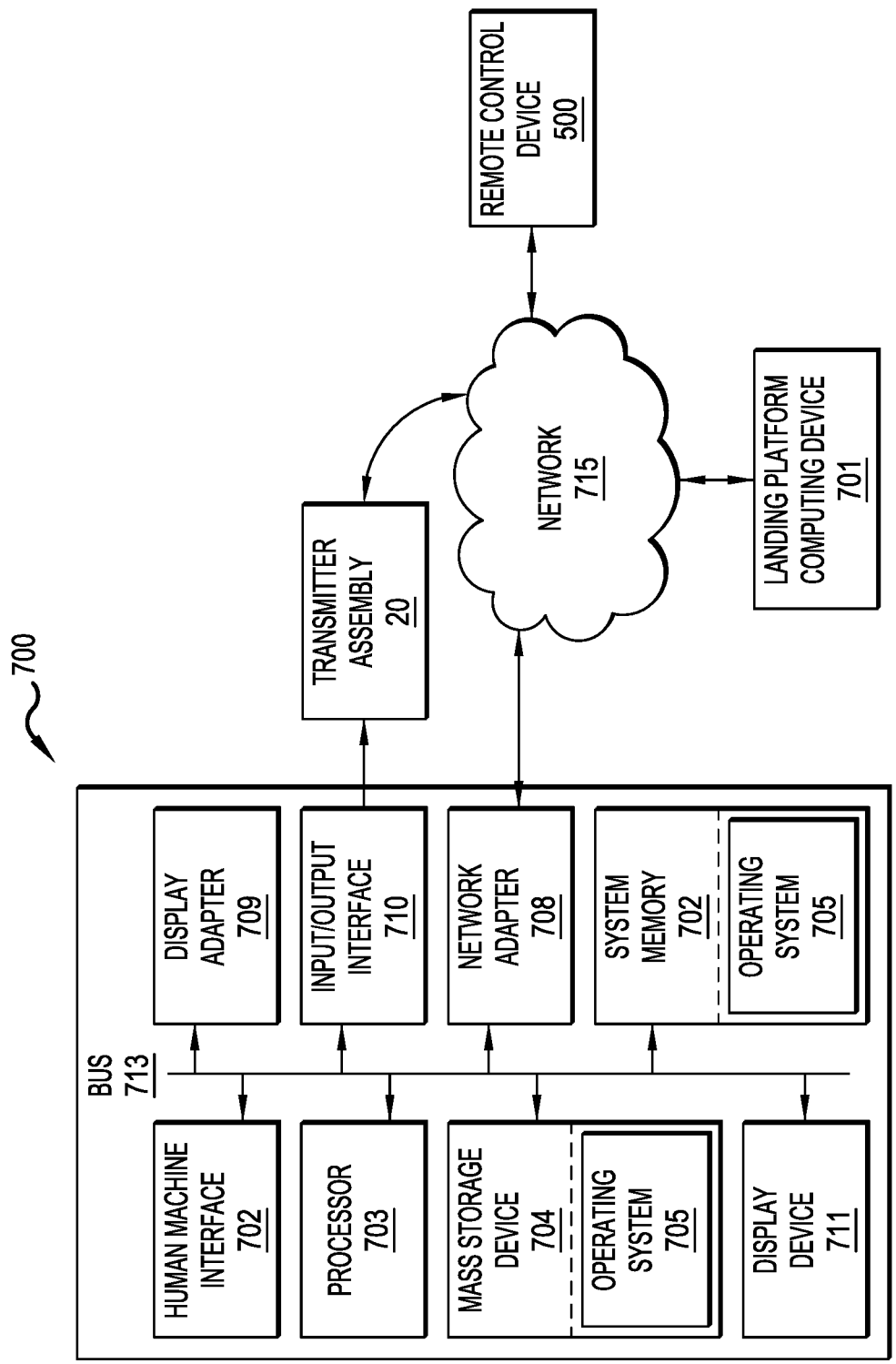
FIG. 25 depicts a block diagram of an arrangement of computing devices.

In an exemplary aspect, the methods and systems can be implemented on a computing system such as computing and described below. The apparatus can have multiple computing devices. For example, the UAV can have a computing device 700 and the landing platform 701 can each have a computing devices that are structured with similar components and operate in similar manners. The UAV computing device 700 can be in communication with a landing platform computing device 701, the aerosol gun transmitter assembly 20, and the remote control device 500. Similarly, the methods and systems disclosed can utilize one or more computers to perform one or more functions in one or more locations. FIG. 25 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics (remote controllers), network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 700, 701. The components of the computing devices 700, 701 can comprise, but are not limited to, one or more processors or processing units 703, a system memory 712, and a system bus 713 that couples various system components including the processing unit 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processing unit 703, a mass storage device 704, an operating system 705, a network adapter 708, system memory 712, an Input/Output Interface 710, a display adapter 709, a display device 711, and a human machine interface 702, can be contained within one or more remote control devices 500 at physically separate locations, connected through buses of this form, in effect implementing a fully distributed system.

The computing devices 700, 701 typically comprises a variety of computer readable media. Exemplary readable media can be any available media that is accessible by the computing device 700, 701 and comprise, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data and/or program modules, such as operating system 705 that are immediately accessible to and/or are presently operated on by the processing unit 703.

Figure 21:
FIG. 21 depicts a bottom view of the alignment rail on the unmanned aerial vehicle (UAV).
Figure 22:
FIG. 22 depicts a front view of the alignment rail on the unmanned aerial vehicle (UAV).
Figure 23:
FIG. 23 depicts a rear view of the alignment rail on the unmanned aerial vehicle (UAV).

In another aspect, the computing devices 700, 701 can also comprise other removable/non-removable, volatile/non-volatile computer storage media. By way of example, FIG. 21 illustrates a mass storage device 704 which can provide non-volatile storage of computer code, computer readable instructions, data structures, program modules, and other data for the computing device 701. For example, and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704. Data can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 700, 701 via an input device (not shown). Examples of such input devices comprise, but are not limited to, a keyboard, pointing device (e.g., a "mouse"), a microphone, a joystick, a scanner, visual systems, audio systems that process sound such as music or speech, a traditional silver remote control, tactile input devices such as gloves, touch-responsive screen, body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 813 via an interface, such as a display adapter 709. It is contemplated that the computing devices can have more than one display adapter 709 and more than one display device 711. For example, a display device can be a monitor, an LCD (Liquid Crystal Display), or a projector. In addition to the display device 711, other output peripheral devices can comprise components such as speakers or cameras (not shown) which can be connected to the computing device 701 via Input/Output Interface 710. Any step and/or result of the methods can be output in any form to an output device. Such output can be any form of visual representation, including, but not limited to, textual, graphical, animation, audio, tactile, and the like. The display device 711 and computing device 700, 701 can be part of one device, or separate devices.

Figure 26:
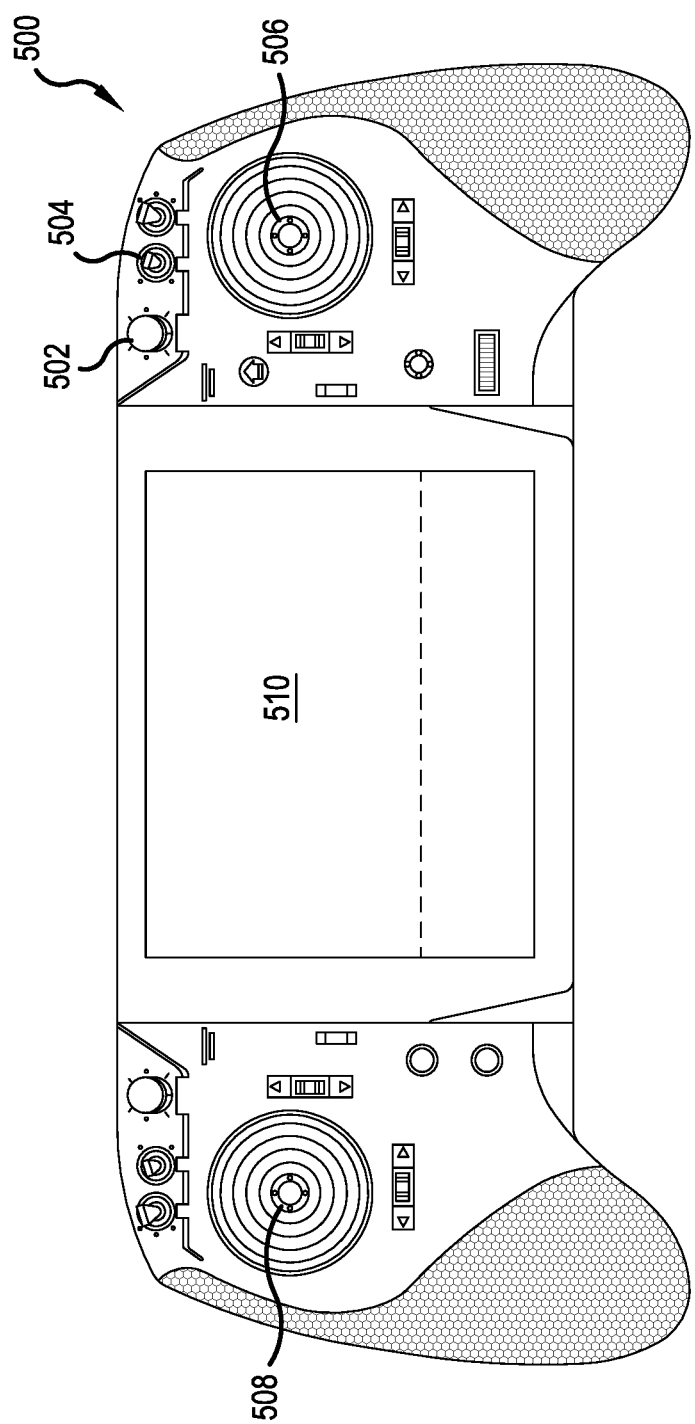
FIG. 26 depicts a front view of an exemplary remote control device.

The computing devices 700, 701 and transmitter assembly 20 can operate in a networked environment using logical connections to one or more remote control devices 500. By way of example, a remote computing device 500 can be a personal computer, portable computer, a smartphone, a server, a router, a network computer, a peer device or other common network node, remote control and so on. Logical connections between the transmitter assembly 20, the platform computing device 701 and the UAV computing device 700 and the remote control device 500 can be made via a network 715, such as a local area network (LAN) and a general wide area network (WAN). In another aspect, the UAV and platform computing device can also communicate with satellites, wherein the GPS coordinates of both the UAV and platform can be identified and communicated. Such network connections can be through a network adapter 708. A network adapter 708 can be implemented in both wired and wireless environments. Such networking environments are conventional and commonplace in dwellings, offices, enterprise-wide computer networks, intranets, and the Internet. As shown in FIG. 26, the remote control device 500 can be a handheld remote control. The hand held remove control can be configured with buttons 502, 504 and toggles switches 506, 508 to allow a user to manipulate the flight of the UAV. In a further aspect, the remote control device 500 can comprise a display interface 510. The remote control display can provide information about the UAV 400, aerosol generator 100, and or the landing pad 800.

For purposes of illustration, application programs and other executable program components such as the operating system 705 are illustrated herein as discrete blocks, although it is recognized that such programs and components reside at various times in different storage components of the computing devices 700, 701, and are executed by the one or more processors 703 of the computer. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

As shown in FIGS. 27-30, the disclosure can comprise a landing pad 800. The landing pad 800 can comprise a platform base 802, a plurality of platform leg members 804, and a platform computing device 701. In another aspect, the landing pad 800 can include a fuel compartment 806, that holds fuel tanks 808 for UAV embodiments that comprise combustion engines or turbine engines. In yet another aspect, the fuel tanks 808 can also be configured to hold the liquid for aerosol generation. The platform base 802 can comprise a surface with sufficient surface area to support the UAV 400 as the UAV lands on the platform base. As shown in FIGS. 31-32, the disclosure can comprise an apparatus 900 that comprises the aerosol generator 100, UAV 400, the landing pad 800. The UAV 400 can perform a vertical lift-off and landing from the top surface 810 of the platform base 802.

In a further aspect, the top surface 810 of the platform base can comprise magnetized regions to facilitate stabilizing the UAV when the UAV landing pad 415 comes in contact with the top surface. In a further aspect, the platform base 802 can also comprise a plurality of orifices that permit for drainage away from the base. In yet a further aspect, platform base can also comprise regions that comprise solar cells 812. The solar cells 812 can positioned on the platform base 802 to receive sunlight and convert to electric energy for subsequent use by the platform or transfer to the UAV 400. In a further aspect, to transfer the electrical energy to the UAV, the platform base 802 can also be configured with induction coils 814 to transfer the energy via electrical induction.

As discussed, the UAV 400 can be powered via a hybrid fuel source, such as combustion engine or turbine. The landing pad 800 can also comprise fuel and aerosol storage compartments 806. As shown in FIG. 27, the fuel compartment 806 can comprise a shelf type bracket that extends from the side of the platform base 802. The fuel compartment can sustain the weight of multiple fuel tanks 808. From each fuel tank, there can be a supply line (not shown) that extends from the from the tank to one of the armatures 816.

The base platform can further comprise fueling armatures 816. In one aspect, the base platform 802 can comprise multiple fueling armatures 816 that can be configured to provide different types of fuel to the UAV 400. For example, one of the armatures 816 can provide electrical energy by coupling an electrical connector 817 to an electrical receptacle 431 in the UAV 400; a second armature can provide liquid/combustible fuel for UAV models with turbine/combustion engines by coupling a nozzle 818 at the end of the second armature 816 to a fuel port 432 in the UAV 400. In another aspect, the second armature 816 used for providing fuel to power the UAV can also be used to provide aerosol to a port 432 on the aerosol generator tank 18, 19. To allow the fueling armature 816 to provide fuel and aerosol, the landing platform 800 can comprise a fuel supply line from the fuel tank 808 and an aerosol supply line from the aerosol tank that also leads to a switching valve. The switching valve can be a valve configured to switch the supply line in the fueling armature from fuel to aerosol. Second, the supply line in the fueling armature 816 can comprise a bleeding valve that can be actuated to open and close to remove the remnant fuel or aerosol if a switch in originating source needs to be made. The switch valve and bleed valve can be in communication with the platform computing device 701, wherein the platform CPU can send generate a control valve signal based a preset protocol or instructions generated from a signal received from the remote control device 500.

Figure 27:
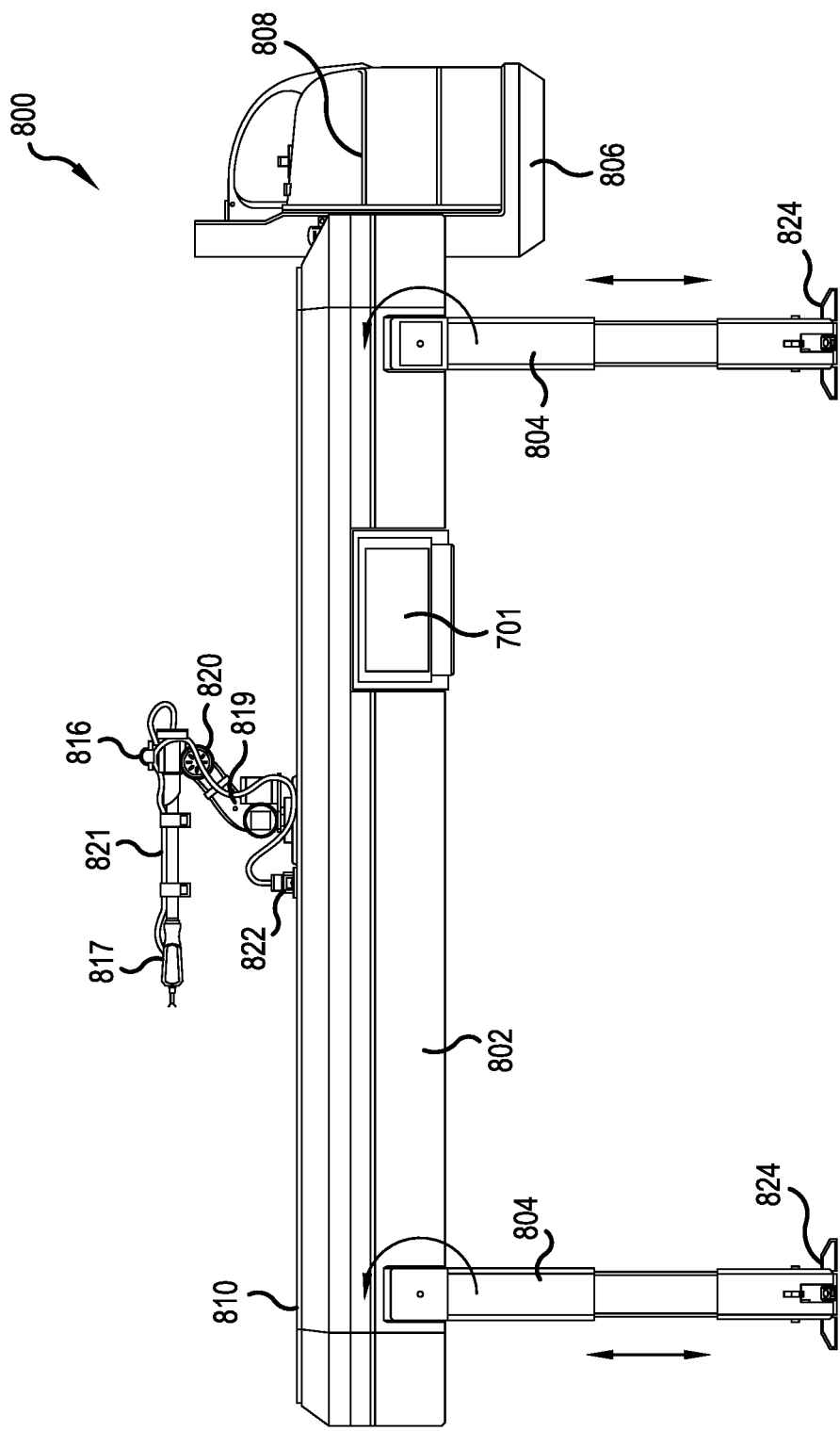
FIG. 27 depicts a side view of the landing platform.
Figure 28:
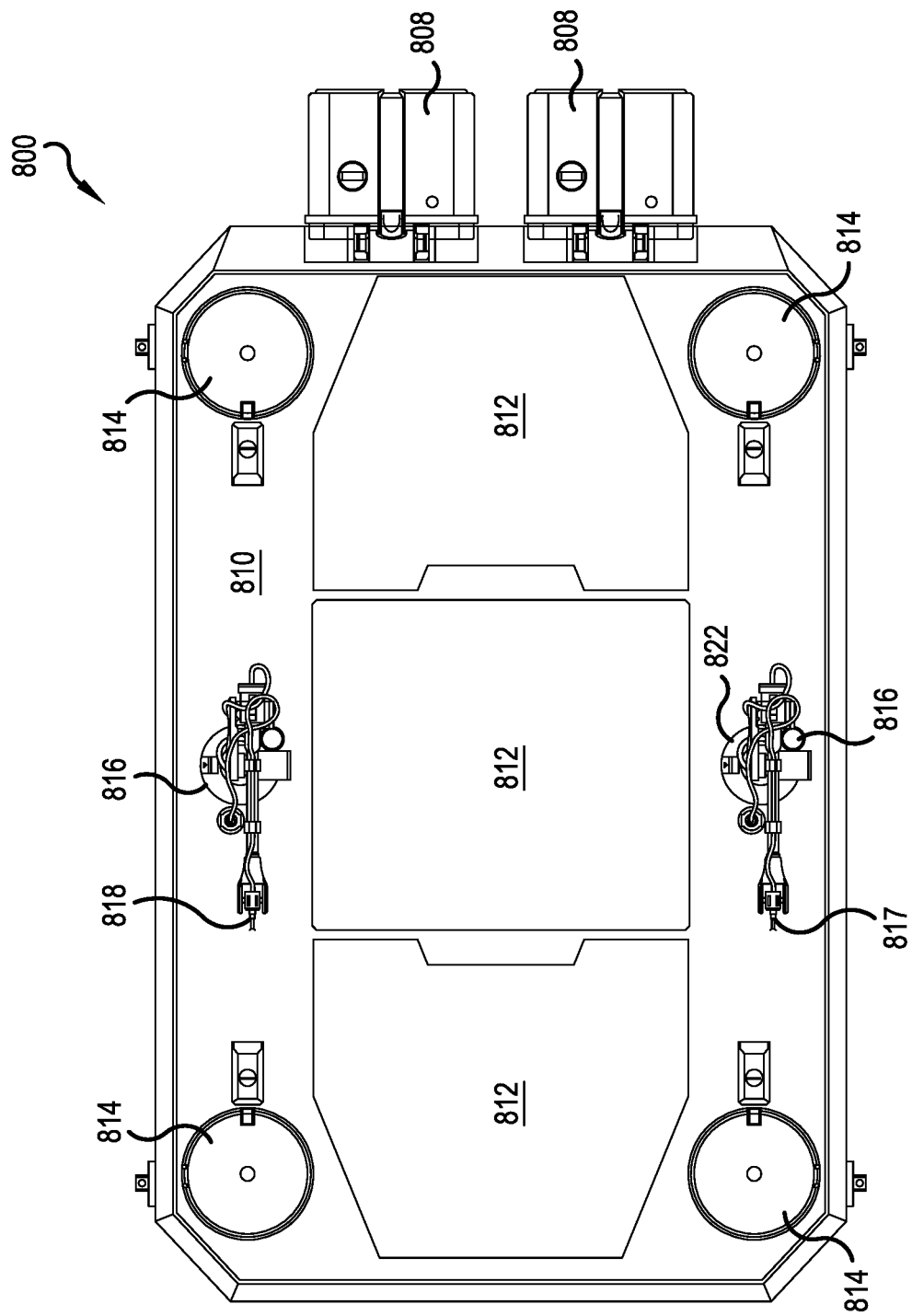
FIG. 28 depicts a top view of the landing platform.
Figure 29:
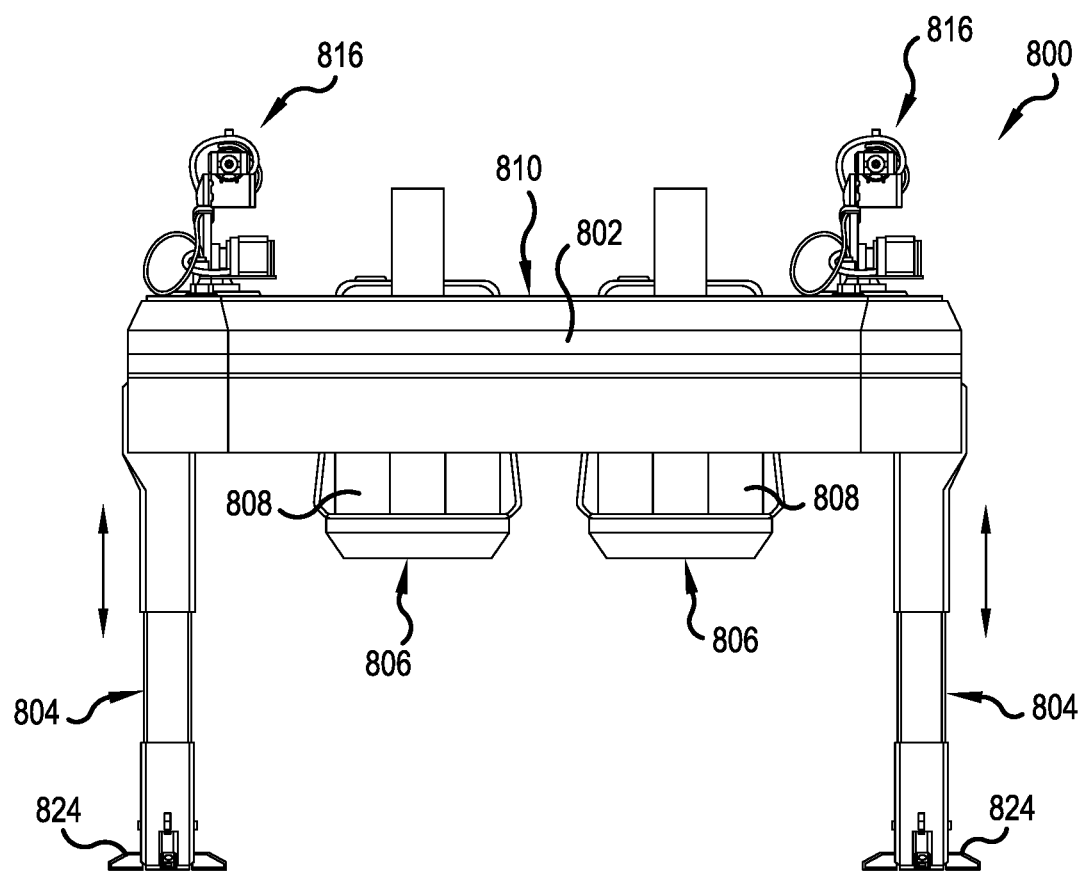
FIG. 29 depicts a front view of the landing platform.
Figure 30:
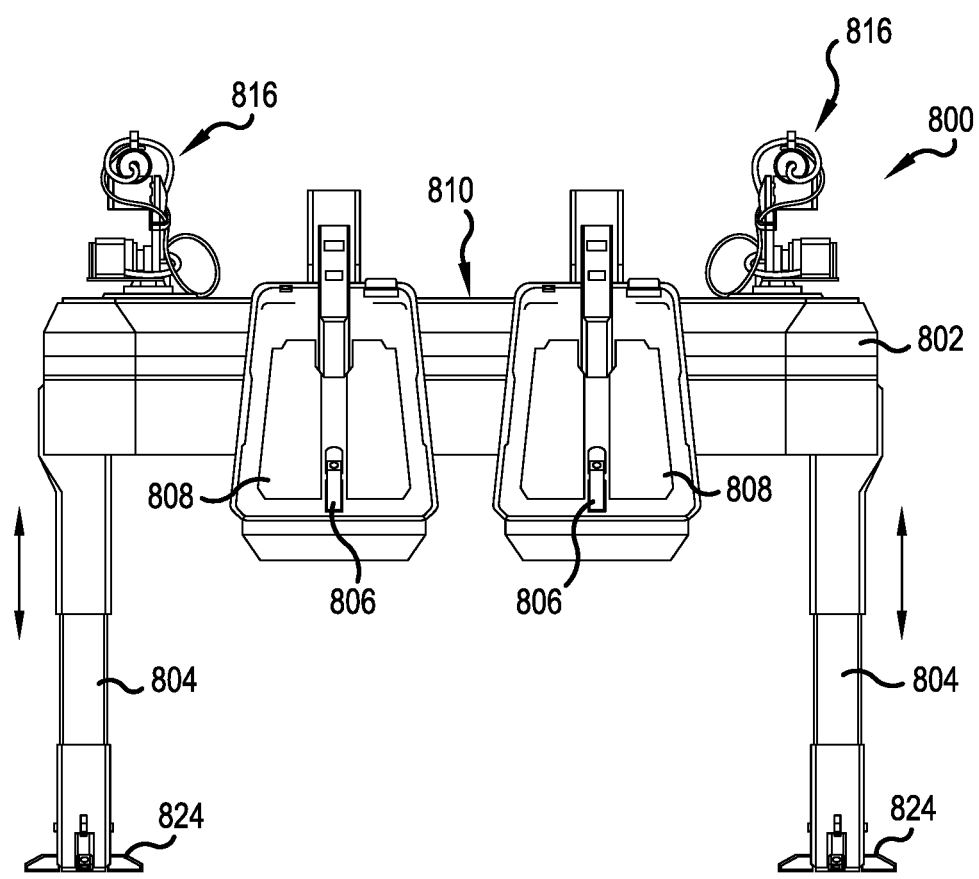
FIG. 30 depicts a rear view of the landing platform.
Figure 31:
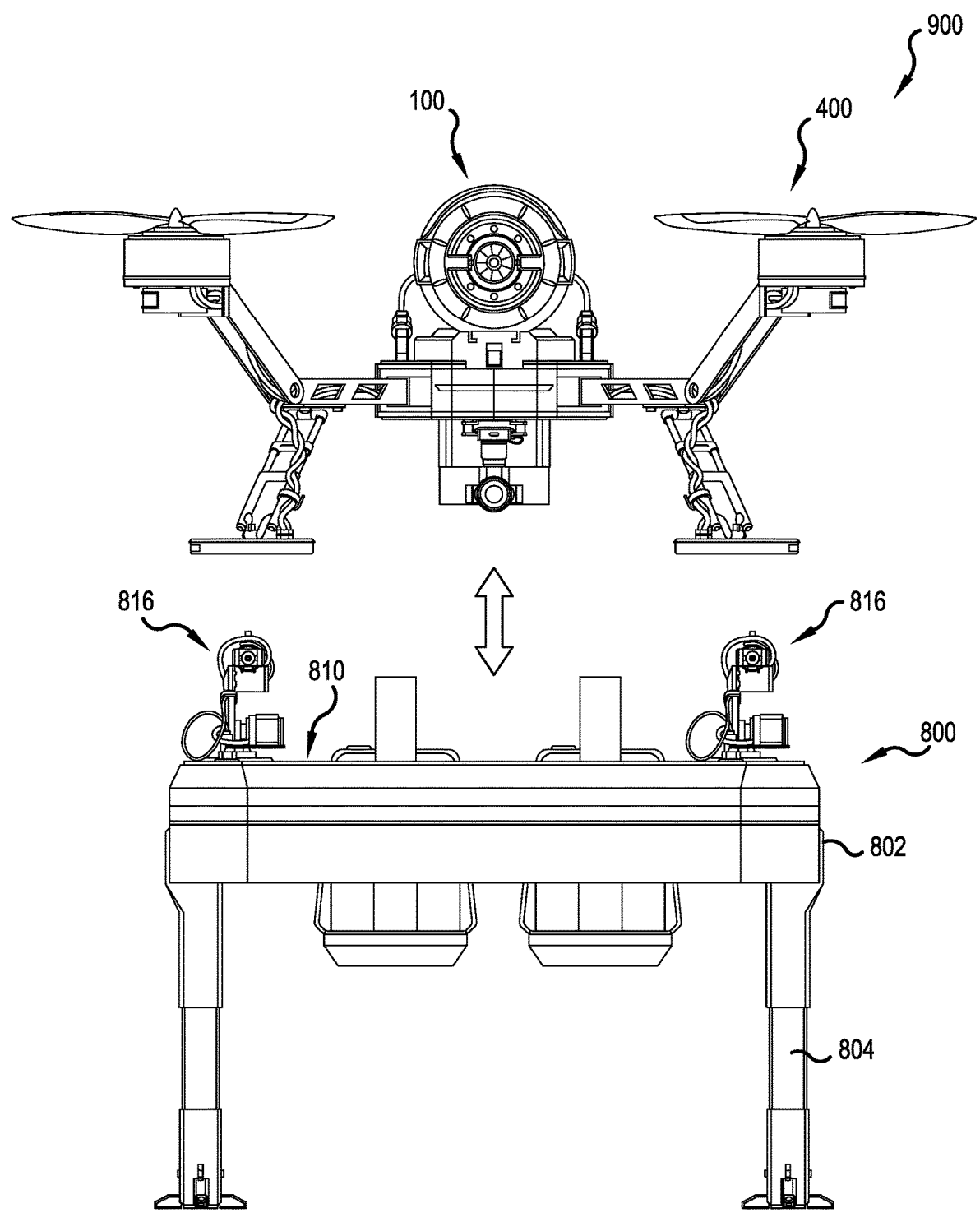
FIG. 31 depicts a front view of the unmanned aerial vehicle couple to the aerosol generator elevating/descending on to the landing platform.
Figure 32:
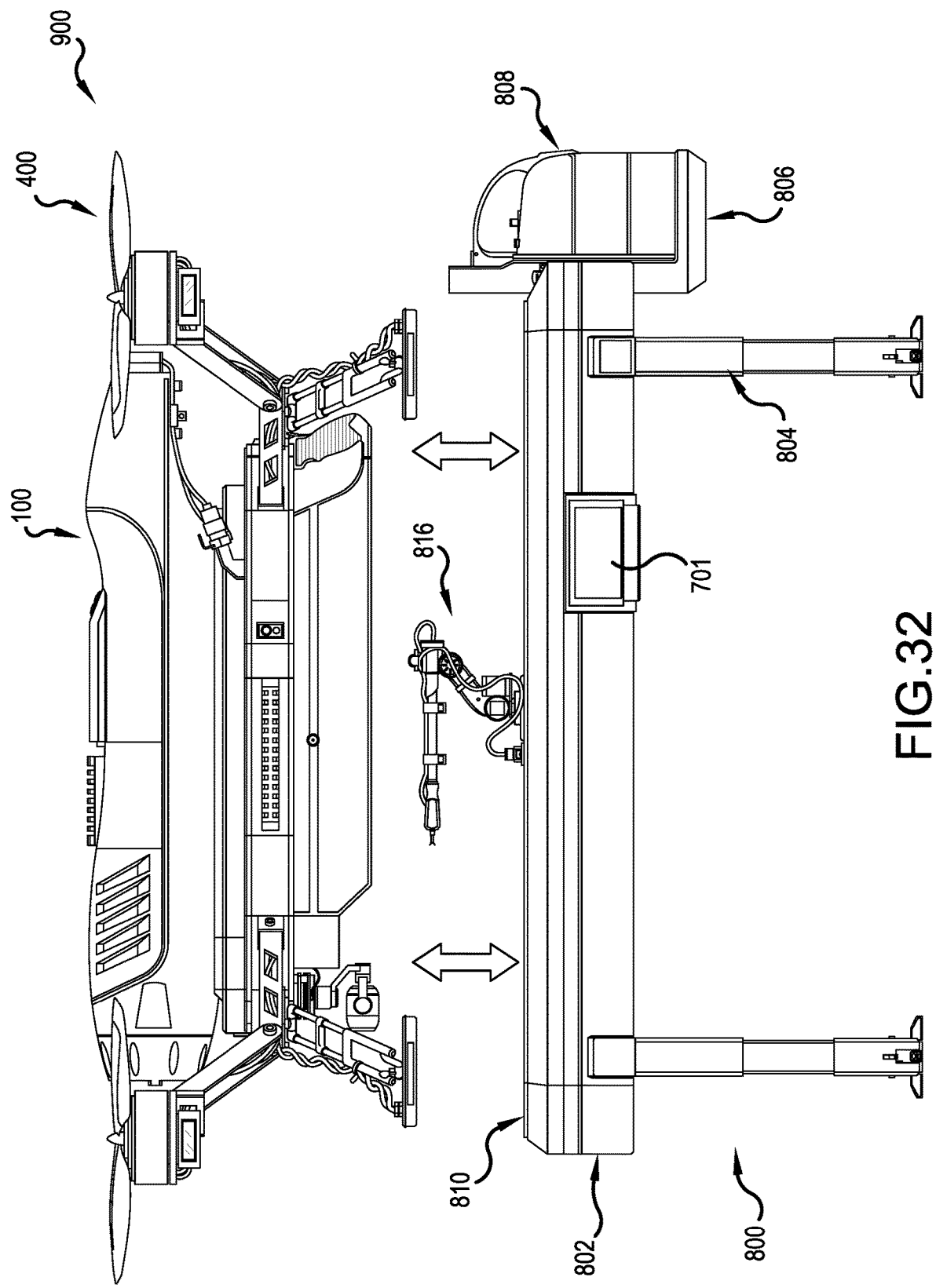
FIG. 32 depicts a side view of the unmanned aerial vehicle couple to the aerosol generator elevating/descending on to the landing platform.

As shown in FIG. 27, the armature can comprise at least two members, a platform base 819 and a fueling member 821, linked at a pivot point 820. At an end of fueling member 821, there can either be an electrical coupling 817 configured to connect to an electrical receptacle 431 on the UAV or a fuel nozzle configured to connect to a fuel port 432 on the UAV 400. In a further aspect, both embodiments with the fuel nozzle and electrical connectors can have a magnetized coupling that can magnetized and demagnetize to stabilize the fueling process. The magnetization of the coupling can be activated by the remote device 500.

The platform base 802 of the armature 816 can be coupled base platform 802 by a rotatable connector 822. Thus, once the UAV has landed and stabilized, the rotatable connector can rotate the armature 816 towards the UAV to initiate a coupling with the fuel port 432 or electrical receptacle 431. The armature motion via the rotatable connector 816 and/or pivot point can be controlled by receiving transmitted communication from the remote control device 500 to the platform central processing unit. In yet another aspect the armature 816 can comprise additional connectors, such as a ball-and-socket type connectors that allows for additional degrees of freedom and control for situations with the UAV 400 has landed in a misaligned orientation on the platform 802. For example, a third connector can be placed at the connection point between the electrical connector/fuel nozzle and an end of the fueling member to provide additional control flexibility when the system is making a connection for fueling.

The landing platform 800 can further comprise a plurality of legs 804. The legs 804 can be connect on the side of the platform base 802 and extends to connect to terrain. In one aspect, the length and orientation each leg is individually controllable by the platform computing device 701. Controlling the legs individually allows the legs to be set at different lengths when the landing platform is placed on jagged or undulating terrain. The platform leg can rotate around the connection point with the platform base 802. Placing the legs at different lengths in these situations can help the platform base 802 to remain level. In one aspect of the leg configuration, legs can 804 extend via a telescoping subcomponents of leg. In another embodiment, the leg configuration can extend or retract via screw-type feature, similar to a car jack. At the leg connection point with the terrain, the legs can comprise a foot pad 824. The foot pad 824 can be a structure that extends laterally from the leg at the connection point with the terrain to increase stability of the leg by increasing the surface area of the leg connection point with the terrain. In a further aspect, the foot pad can be spring loaded. A spring loaded foot pad 824 allows the legs 804 to endure some deflection when the weight of the UAV 400 is placed on the platform base 802 during landing or when the platform is enduring bad weather such as heavy wind. In another aspect, the foot pad can also define a least one cavity to receive a fastener, such as a spike, for securing the landing platform 800 to the terrain/surface.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

What is claimed is:

1. An apparatus comprising:
  an aerosol generator comprising:

a solution tank assembly wherein the solution tank assembly is configured to transport an aerosol solution, a motor device wherein the motor device is configured to vaporize the aerosol solution and expel the aerosol solution from the aerosol generator, an engine control unit in electrical communication with the motor device, a transmitter assembly in electrical communication with the solution tank assembly and engine control unit, configured actuate operation of the aerosol generator; and an unmanned aerial vehicle (UAV) comprising:
a vehicle body configured to couple to a portion of the aerosol generator
a power unit configured to provide lift, thrust and direction to the unmanned aerial vehicle, and
a vehicle computer in communication with the transmitter assembly;
and a light array in communication with the vehicle computer.

2. The apparatus of claim 1 further comprising a remote control device in communication with the transmitter assembly and the vehicle computer.

3. The unmanned aerial vehicle of claim 1 wherein the power unit comprises a propeller wherein the at least one configured adjust the altitude, pitch, roll, and yaw of the unmanned aerial vehicle.

4. The aerosol generator of claim 1 wherein the vehicle computer is configured to transmit global positioning coordinates to a satellite.

5. The aerosol system of claim 1, wherein the motor device is an internal combustion turbine.

6. The aerosol generator of claim 1, wherein the generator comprises a plurality of modular components such that modular components can be detached from aerosol generator to facilitate coupling to the aerosol generator.

7. An apparatus comprising:
an aerosol generator comprising:
a solution tank assembly wherein the solution tank assembly is configured to transport an aerosol solution,
a motor device wherein the motor device is configured to vaporize the aerosol solution and expel the aerosol solution from the aerosol generator,
an engine control unit in electrical communication with the motor device,
a transmitter assembly in electrical communication with the solution tank assembly and engine control unit, configured actuate operation of the aerosol generator; and
an unmanned aerial vehicle (UAV) comprising:
a vehicle body configured to couple to a portion of the aerosol generator a power unit, and
a vehicle computer in communication with the transmitter assembly; and
a remote control device in communication with the transmitter assembly and the vehicle computed;wherein the unmanned aerial vehicle is configured to adjust the decibel level of the output generated by the power unit.

8. The unmanned aerial vehicle of claim 7 wherein the power unit comprises a propeller wherein the at least one configured adjust the altitude, pitch, roll, and yaw of the unmanned aerial vehicle.

9. The aerosol generator of claim 7 wherein the vehicle is configured to transmit global positioning coordinates to a satellite.

10. The aerosol dispersal system of claim 7, wherein the motor device is an internal combustion turbine.

11. The unmanned aerial vehicle of claim 7, wherein the motor unit is comprises an orientation correction device to adjust a misaligned orientation of the unmanned ariel vehicle.

12. The unmanned aerial vehicle of claim 7 further comprising a light array in communication with the vehicle computer.

13. An apparatus comprising:
an aerosol generator comprising
a solution tank assembly wherein the solution tank assembly is configured to transport an aerosol solution,
a motor device wherein the motor device is configured to vaporize the aerosol solution and expel the aerosol solution from the aerosol generator,
an engine control unit in electrical communication with the motor device,
a transmitter assembly in electrical communication with the solution tank assembly, and engine control unit, configured actuate operation of the aerosol generator;
an unmanned aerial vehicle (UAV) comprising:
a vehicle body configured to couple to a portion of the aerosol generator,
a power unit configured to provide lift, thrust and direction to the unmanned aerial vehicle,
a vehicle computer in communication with the transmitter assembly;
a remote control device in communication with the transmitter assembly and the vehicle computer; and
a landing platform configured to be detachably coupled to a portion of the unmanned aerial vehicle, where in the landing platform comprises a plurality of leg members extending from the landing platform.

14. The aerosol generator of claim 13, wherein the generator comprises a plurality of modular components such that modular components can be detached from aerosol generator to facilitate coupling to the aerosol generator.

15. The landing platform of claim 13, wherein a surface of the landing platform comprises a plurality of solar cells.

16. The landing platform of claim 13 wherein each leg of the plurality of legs are configured to rotate and extend or retract along a length dimension.

17. The landing platform of claim 13, the surface of the landing platform further comprises at least one armature, wherein the armature is configured for movement and coupling with the unmanned aerial vehicle.

18. The unmanned aerial vehicle of claim 13, wherein the unmanned aerial vehicle comprises at least one electrical induction coil.

19. The landing platform of claim 13 wherein the surface of the landing platform comprises at least one mate electrical induction coil, wherein the at least one mate electrical induction coil is configured to align with the at least on electrical induction coil of the unmanned aerial vehicle.

* * * * *